(12) United States Patent
Gaspar et al.

(10) Patent No.: US 12,434,371 B2
(45) Date of Patent: *Oct. 7, 2025

(54) ELECTRONIC CLUTCH FOR POWER TOOLS

(71) Applicant: MILWAUKEE ELECTRIC TOOL CORPORATION, Brookfield, WI (US)

(72) Inventors: Austin Gaspar, Maple Valley, WA (US); Robert Keys, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 220 days.

This patent is subject to a terminal disclaimer.

(21) Appl. No.: 18/186,421

(22) Filed: Mar. 20, 2023

(65) Prior Publication Data

US 2023/0321810 A1 Oct. 12, 2023

Related U.S. Application Data

(60) Provisional application No. 63/384,891, filed on Nov. 23, 2022, provisional application No. 63/322,949, filed on Mar. 23, 2022.

(51) Int. Cl.
 *B25F 5/00* (2006.01)
 *H02K 7/11* (2006.01)
 (Continued)

(52) U.S. Cl.
 CPC ............... *B25F 5/001* (2013.01); *H02K 7/11* (2013.01); *H02K 7/145* (2013.01); *H02P 21/22* (2016.02); *H02P 27/085* (2013.01)

(58) Field of Classification Search
 CPC ......... H02P 21/22; H02P 27/085; H02K 7/11; H02K 7/145; B25F 5/001
 See application file for complete search history.

(56) References Cited

U.S. PATENT DOCUMENTS 4,418,765 A 12/1983 Mori et al.
4,503,370 A 3/1985 Cuneo
(Continued)

FOREIGN PATENT DOCUMENTS

CN 101247100 A 8/2008
CN 201349196 Y 11/2009
(Continued)

OTHER PUBLICATIONS

Extended European Search Report for Application No. 23163450.2 dated Sep. 19, 2023 (8 pages).
(Continued)

*Primary Examiner* — Kawing Chan
(74) *Attorney, Agent, or Firm* — Michael Best & Friedrich LLP

(57) ABSTRACT

Systems and methods for electronically limiting torque in a power tool. One power tool includes a motor, a trigger, and a controller connected to the trigger and the motor. The controller is configured to provide, in response to actuation of the trigger, power to the motor, determine a speed of the motor, activate the electronic clutch, in response to determining that the speed of the motor has dropped by the speed drop threshold within the first period of time, to electronically brake the motor for a second period of time, and provide, in response to the second period of time having passed, power to the motor.

20 Claims, 23 Drawing Sheets

(51) Int. Cl.
*H02K 7/14* (2006.01)
*H02P 21/22* (2016.01)
*H02P 27/08* (2006.01)

(56) References Cited

U.S. PATENT DOCUMENTS

| | | | |
|---|---|---|---|
| 5,410,229 | A | 4/1995 | Sebastian et al. |
| 6,424,799 | B1 | 7/2002 | Gilmore |
| 6,604,666 | B1 | 8/2003 | Pedicini et al. |
| 6,700,341 | B2 | 3/2004 | Schaer et al. |
| 6,705,503 | B1 | 3/2004 | Pedicini et al. |
| 6,766,935 | B2 | 7/2004 | Pedicini et al. |
| 6,769,593 | B2 | 8/2004 | Pedicini et al. |
| 7,446,493 | B2 | 11/2008 | Forster et al. |
| 7,551,411 | B2 | 6/2009 | Woods et al. |
| 7,677,844 | B2 | 3/2010 | Schell et al. |
| 7,817,384 | B2 | 10/2010 | Woods et al. |
| 7,882,899 | B2 | 2/2011 | Borinato et al. |
| 8,047,415 | B2 | 11/2011 | Kunz et al. |
| 8,096,456 | B2 | 1/2012 | Kunz et al. |
| 8,132,702 | B2 | 3/2012 | Kunz et al. |
| 8,490,516 | B2 | 7/2013 | Baba et al. |
| 8,631,986 | B2 | 1/2014 | Hlinka et al. |
| 8,657,031 | B2 | 2/2014 | Kononenko et al. |
| 8,674,640 | B2 | 3/2014 | Suda et al. |
| 8,727,941 | B2 | 5/2014 | Aoki |
| 8,796,976 | B2 | 8/2014 | Kusakawa |
| 8,919,456 | B2 | 12/2014 | Ng et al. |
| D725,982 | S | 4/2015 | Miller |
| 9,193,055 | B2 | 11/2015 | Lim et al. |
| D750,460 | S | 3/2016 | Miller |
| 9,352,456 | B2 | 5/2016 | Murthy et al. |
| 9,505,097 | B2 | 11/2016 | Aoki et al. |
| 9,533,406 | B2 | 1/2017 | Aoki |
| 9,908,182 | B2 | 3/2018 | Phillips et al. |
| 10,011,006 | B2 | 7/2018 | Sergyeyenko et al. |
| 10,220,500 | B2 | 3/2019 | Lim et al. |
| 10,333,441 | B2 | 6/2019 | Koniakowsky et al. |
| 10,737,373 | B2 | 8/2020 | Duncan et al. |
| 10,786,891 | B2 | 9/2020 | Noguchi et al. |
| 10,850,380 | B2 | 12/2020 | Huber et al. |
| 11,130,218 | B2 | 9/2021 | Hu |
| 11,219,993 | B2 | 1/2022 | Heimrich |
| 12,122,028 | B2 * | 10/2024 | Miller ................... B25C 1/06 |
| 2004/0232194 | A1 | 11/2004 | Pedicini et al. |
| 2006/0180631 | A1 | 8/2006 | Pedicini et al. |
| 2011/0000688 | A1 | 1/2011 | Iwata |
| 2011/0030980 | A1 | 2/2011 | Ho |
| 2011/0303428 | A1 | 12/2011 | Roth et al. |
| 2013/0056236 | A1 | 3/2013 | Morinishi et al. |
| 2013/0068491 | A1 | 3/2013 | Kusakawa et al. |
| 2013/0269961 | A1 * | 10/2013 | Lim ....................... B25F 5/001 173/1 |
| 2013/0327552 | A1 | 12/2013 | Lovelass et al. |
| 2014/0284070 | A1 | 9/2014 | Ng et al. |
| 2015/0041164 | A1 * | 2/2015 | Sergyeyenko ........ B25B 23/147 173/176 |
| 2015/0298308 | A1 | 10/2015 | Kato |
| 2016/0031072 | A1 | 2/2016 | Im et al. |
| 2016/0354888 | A1 | 12/2016 | Huber et al. |
| 2017/0217004 | A1 | 8/2017 | Kato |
| 2018/0154456 | A1 | 6/2018 | Phillips et al. |
| 2018/0318999 | A1 | 11/2018 | Lovelass et al. |
| 2019/0047133 | A1 | 2/2019 | Beckert et al. |
| 2019/0118362 | A1 | 4/2019 | Greunke et al. |
| 2019/0134801 | A1 | 5/2019 | Merget et al. |
| 2020/0114500 | A1 | 4/2020 | Bierdeman et al. |
| 2020/0331136 | A1 | 10/2020 | Duncan et al. |
| 2021/0039231 | A1 | 2/2021 | Araki et al. |
| 2021/0078151 | A1 | 3/2021 | Huber et al. |
| 2021/0078153 | A1 | 3/2021 | Sunabe et al. |
| 2022/0001522 | A1 | 1/2022 | Duncan et al. |
| 2023/0381938 | A1 * | 11/2023 | Miller ..................... B25C 1/06 |

FOREIGN PATENT DOCUMENTS

| | | |
|---|---|---|
| CN | 101786178 B | 10/2012 |
| CN | 104602510 A | 5/2015 |
| CN | 107000189 A | 8/2017 |
| CN | 108000440 A | 5/2018 |
| CN | 207309881 U | 5/2018 |
| CN | 220373192 U | 1/2024 |
| CN | 220551229 U | 3/2024 |
| DE | 10348756 B4 | 1/2011 |
| EP | 3912763 A1 | 11/2021 |
| WO | 2018003370 A1 | 1/2018 |
| WO | 2019000379 A1 | 1/2019 |
| WO | 2021016437 A1 | 1/2021 |

OTHER PUBLICATIONS

Chinese Patent Office Action for Application No. 202310302829.6 dated Jun. 14, 2024 (10 pages including English translation).

* cited by examiner

ELECTRONIC CLUTCH FOR POWER TOOLS

RELATED APPLICATIONS

This application claims the benefit of U.S. Provisional Patent Application No. 63/384,891, filed Nov. 23, 2022, and U.S. Provisional Patent Application No. 63/322,949, filed Mar. 23, 2022, the entire contents of which are hereby incorporated by reference.

SUMMARY

Embodiments described herein provide systems and methods for implementing an electronic clutch in a power tool.

Power tools described herein include an electronic clutch. The power tools include a motor, a trigger, and a controller connected to the trigger and the motor. The controller is configured to provide, in response to actuation of the trigger, power to the motor, determine a speed of the motor, activate the electronic clutch, in response to determining that the speed of the motor has dropped by the speed drop threshold within the first period of time, to electronically brake the motor for a second period of time, and provide, in response to the second period of time having passed, power to the motor.

In some aspects, the controller is further configured to determine, based on the speed of the motor and a speed command signal, a torque value at which to drive the motor, compare the torque value to a torque-current look-up table, determine, based on the comparison, an electric current value to provide to the motor, and provide the electric current value to the motor to drive the motor.

In some aspects, the power tool further includes a current sensor configured to provide current signals indicative of a current of the motor, and wherein the controller is further configured to receive, from the current sensor, the current signals indicative of the current of the motor, determine a pulse width modulation (PWM) duty cycle ratio based on the current of the motor and the electric current value, and drive the motor according to the PWM duty cycle ratio.

In some aspects, the power tool includes a torque sensor configured to provide torque signals indicative of a torque of the motor, and the controller is further configured to receive, from the torque sensor, torque signals indicative of the torque of the motor, determine a pulse width modulation (PWM) duty cycle ratio based on the torque of the motor and a desired torque value, and drive the motor according to the PWM duty cycle ratio.

In some aspects, the controller is further configured to control, in response to actuation of the trigger, the motor according to a first operating mode for a third period of time.

In some aspects, the controller is further configured to limit, in response to the third period of time having passed, a motor current provided to the motor for a fourth period of time.

In some aspects, the controller is further configured to control, in response to the fourth period of time having passed, the motor according to the first operating mode.

In some aspects, the power tool further includes an input device configured to set a desired torque value, and wherein the controller is further configured to determine a torque limit based on the desired torque value, and control the motor based in part on the torque limit.

In some aspects, the input device is a torque ring.

In some aspects, the controller is configured to detect a high load state of the motor based on the speed of the motor, and limit, in response to the high load state of the motor, a torque value at which to drive the motor.

Methods described herein for operating a power tool including an electronic clutch include providing, in response to actuation of a trigger, power to a motor, determining a speed of the motor, determining whether the speed of the motor has dropped by a speed drop threshold within a first period of time, activating the electronic clutch, in response to determining that the speed of the motor has dropped by the speed drop threshold within the first period of time, to electronically brake the motor for a second period of time, and providing, in response to the second period of time having passed, power to the motor.

In some aspects, the method further includes determining, based on the speed of the motor and a speed command, a torque value at which to drive the motor, comparing the torque value to a torque-current look-up table, determining, based on the comparison, an electric current value to provide to the motor, and providing the electric current value to the motor to drive the motor.

In some aspects, the method further includes receiving, from a current sensor, current signals indicative of a current of the motor, determining a pulse width modulation (PWM) duty cycle ratio based on the current of the motor and the electric current value, and driving the motor according to the PWM duty cycle ratio.

In some aspects, the method further includes receiving, from a torque sensor, torque signals indicative of a torque of the motor, determining a pulse width modulation (PWM) duty cycle ratio based on the torque of the motor and a desired torque value, and driving the motor according to the PWM duty cycle ratio.

In some aspects, the method further includes controlling, in response to actuation of the trigger, the motor according to a first operating mode for a third period of time, and limiting, in response to the third period of time having passed, a motor current provided to the motor for a fourth period of time.

In some aspects, the method further includes determining a torque limit based on a desired torque value, and controlling the motor based in part on the torque limit.

In some aspects, the method further includes detecting a high load state of the motor based on the speed of the motor, and limiting, in response to the high load state of the motor, a torque value at which to drive the motor.

In some aspects, the method further includes receiving, from a temperature sensor, temperature signals indicative of a temperature of a mechanism driven by the motor, determining, based on the temperature signals, a torque value at which to drive the motor, and driving the motor according to the torque value.

Power tools described herein include electronic clutch. The power tools include a motor and a controller connected to the motor. The controller is configured to drive the motor according to a first speed setting, determine a speed of the motor, determine, while in the first speed setting, whether the speed of the motor is greater than or equal to a first speed threshold, drive, in response to the speed of the motor being greater than or equal to the speed threshold, the motor according to a second speed setting, determine, while in the second speed setting, whether the speed of the motor is less than a second speed threshold, and limit, in response to determining that the speed of the motor is below the second speed threshold, a motor current for a clutch timeout period.

In some aspects, the controller is further configured to drive, in response to the clutch timeout period having passed, the motor according to the first speed setting.

In some aspects, the first speed threshold is equal to the second speed threshold.

In some aspects, the power tool further includes an input device configured to set a desired torque value, and wherein the controller is further configured to calculate a torque limit based on the desired torque value, and control the motor based in part on the torque limit.

Power tools described herein include an electronic clutch. The power tools include a motor, a mechanism coupled to the motor, a temperature sensor configured to provide temperature signals indicative of a temperature of the mechanism, a trigger, and a controller connected to the trigger and the motor. The controller is configured to provide, in response to actuation of the trigger, power to the motor, receive, from the temperature sensor, the temperature signals indicative of the temperature of the mechanism, and determine, based on the temperature signals, a torque value at which to drive the motor.

Power tools described herein include a motor, a geartrain coupled to the motor, a gear selector device configured to set a gear ratio of the geartrain, a trigger, and a controller. The controller is connected to the motor, the trigger, and the gear selector device. The controller is configured to receive, from the trigger, an indication to drive the motor, determine a torque setting of the power tool, determine a speed setting of the power tool, and control, based on the torque setting and the speed setting, the gear selector device to set the gear ratio of the geartrain.

In some aspects, the gear selector device includes a solenoid, a ferromagnetic guide ring, and a spring coupled to the ferromagnetic guide ring.

In some aspects, the controller is further configured to control the gear selector device by providing a current to the solenoid to generate a magnetic flux, and the magnetic flux provides a force on the ferromagnetic guide ring greater than and opposite to a force provided by the spring on the ferromagnetic guide ring.

In some aspects, the controller is further configured to determine whether the torque setting of the power tool is within a low torque range and control, in response to the torque setting not being within the low torque range, the gear selector device to set the gear ratio to a default gear ratio.

In some aspects, the controller is further configured to determine whether the speed setting of the power tool is a low speed mode and control, in response to the speed setting of the power tool not being the low speed mode, the gear selector device to set the gear ratio to the default gear ratio.

In some aspects, the controller is further configured to control, in response to the torque setting of the power tool being within the low torque range and in response to the speed setting of the power tool being the low speed mode, the gear selector device to set the gear ratio to a second gear ratio different from the default gear ratio.

Methods described herein for operating a power tool include receiving, from a trigger, an indication to drive a motor, determining a torque setting of the power tool, determining a speed setting of the power tool, and controlling, based on the torque setting and the speed setting, a gear selector device to set a gear ratio of a geartrain coupled to the motor.

In some aspects, the method further includes controlling the gear selector device by providing a current to a solenoid to generate a magnetic flux.

In some aspects, the method further includes determining whether the torque setting of the power tool is within a low torque range and controlling, in response to the torque setting not being within the low torque range, the gear selector device to set the gear ratio to a default gear ratio.

In some aspects, the method further includes determining whether the speed setting of the power tool is a low speed mode and controlling, in response to the speed setting of the power tool not being the low speed mode, the gear selector device to set the gear ratio to the default gear ratio.

In some aspects, the method further includes controlling, in response to the torque setting of the power tool being within the low torque range and in response to the speed setting of the power tool being the low speed mode, the gear selector device to set the gear ratio to a second gear ratio different from the default gear ratio.

Power tools described herein include a motor, a battery pack, a switching network connected between the motor and the battery pack and configured to provide power to the motor, a current sensor configured to sense a current of the motor, a trigger, and a controller connected to the switching network, the trigger, and the current sensor. The switching network includes a plurality of switches. The controller is configured to drive, in response to actuation of the trigger, the motor by controlling the plurality of switches at a first pulse width modulation (PWM) frequency, receive, from the current sensor, a current signal indicative of the current of the motor, select a second PWM frequency based on the current signal, and drive the motor by controlling the plurality of switches at the second PWM frequency.

In some aspects, the power tool further includes a position sensor configured to sense a position of the motor, and the controller is further configured to receive, from the position sensor, a position signal indicative of the position of the motor, generate a noise signal based on the position of the motor, and inject the noise signal into a voltage command signal, the noise signal being opposite in magnitude to a natural noise generated by the motor.

In some aspects, to generate the noise signal, the controller is further configured to compare a torque of the motor and an angular velocity of the motor to a first look-up table to generate a first voltage magnitude and a first phase offset, sum the first phase offset with a first harmonic of a frequency of a torque ripple generated by the motor to generate a first harmonic summation, and sum the first voltage magnitude and the first harmonic summation.

In some aspects, to generate the noise signal, the controller is further configured to compare the torque of the motor and the angular velocity of the motor to a second look-up table to generate a second voltage magnitude and a second phase offset, sum the second phase offset with a second harmonic of the frequency of the torque ripple generated by the motor to generate a second harmonic summation, and sum the second voltage magnitude and the second harmonic summation.

In some aspects, the controller is configured to select the second PWM signal by comparing the current signal to a table stored in a memory.

In some aspects, the power tool further includes a temperature sensor configured to sense a temperature of the plurality of switches, and the controller is further configured to receive, from the temperature sensor, a temperature signal indicative of the temperature of the plurality of switches, adjust the second PWM frequency based on the temperature signal to generate a third PWM frequency, and drive the motor by controlling the plurality of switches at the third PWM frequency.

Methods described herein for operating a power tool include driving, in response to actuation of a trigger, a motor by controlling a plurality of switches at a first pulse width modulation (PWM) frequency, wherein the plurality of switches are connected between the motor and a battery pack and configured to provide power to the motor, receiving, from a current sensor, a current signal indicative of a current of the motor, selecting a second PWM frequency based on the current signal, and driving the motor by controlling the plurality of switches at the second PWM frequency.

In some aspects, the method further includes receiving, from a position sensor, a position signal indicative of a position of the motor, generating a noise signal based on the position of the motor, and injecting the noise signal into a voltage command signal, the noise signal being opposite in magnitude to a natural noise generated by the motor.

In some aspects, generating the noise signal further includes comparing a torque of the motor and an angular velocity of the motor to a first look-up table to generate a first voltage magnitude and a first phase offset, summing the first phase offset with a first harmonic of a frequency of a torque ripple generated by the motor to generate a first harmonic summation, and summing the first voltage magnitude and the first harmonic summation.

In some aspects, generating the noise signal further includes comparing the torque of the motor and the angular velocity of the motor to a second look-up table to generate a second voltage magnitude and a second phase offset, summing the second phase offset with a second harmonic of the frequency of the torque ripple generated by the motor to generate a second harmonic summation, and summing the second voltage magnitude and the second harmonic summation.

In some aspects, selecting the second PWM frequency includes comparing the current signal to a table.

In some aspects, the method further includes receiving, from a temperature sensor, a temperature signal indicative of a temperature of the plurality of switches, adjusting the second PWM frequency based on the temperature signal to generate a third PWM frequency, and driving the motor by controlling the plurality of switches at the third PWM frequency.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

DETAILED DESCRIPTION

Figure 1:
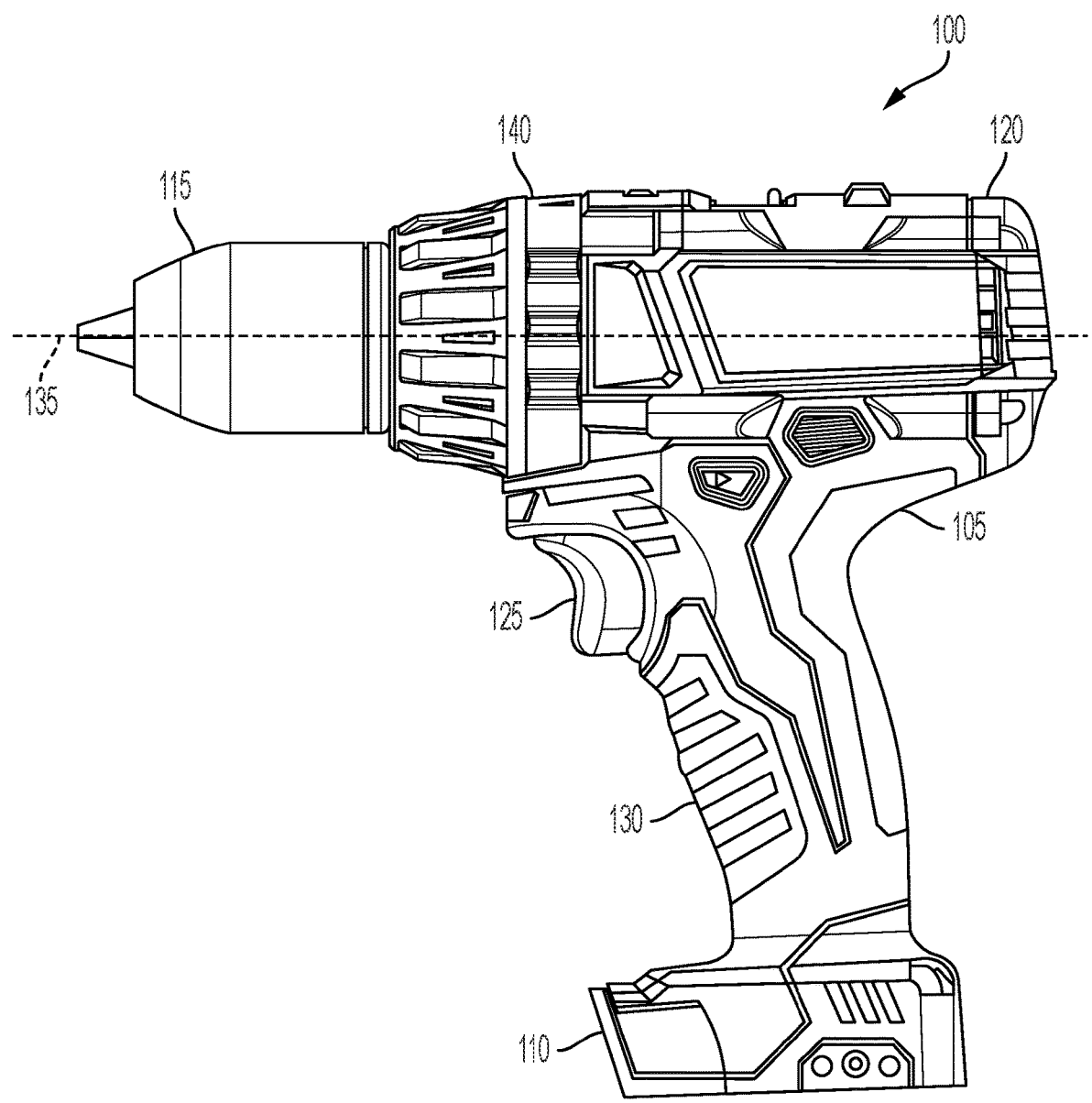
FIG. 1 illustrates a power tool in accordance with embodiments described herein.

FIG. 1 illustrates an example power tool 100 including an electronic clutch, according to some embodiments. The power tool 100 includes a housing 105, a battery pack interface 110, a driver 115 (e.g., a chuck or bit holder), a motor housing 120, a trigger 125, a handle 130, and an input device 140. The motor housing 120 houses a motor 280 (see FIG. 2). A longitudinal axis 135 extends from the driver 115 through a rear of the motor housing 120. During operation, the driver 115 rotates about the longitudinal axis 135. The longitudinal axis 135 may be approximately perpendicular with the handle 130. While FIG. 1 illustrates a specific power tool 100 with a rotational output, it is contemplated that the electronic clutch described herein may be used with multiple types of power tools, such as drills, drivers, powered screw drivers, powered ratchets, grinders, right angle drills, rotary hammers, pipe threaders, or another type of power tool that experiences rotation about an axis (e.g., longitudinal axis 135). In some embodiments, the power tool 100 is a power tool that experiences translational movement along the longitudinal axis 135, such as reciprocal saws, chainsaws, pole-saws, circular saws, cut-off saws, die-grinder, and table saws.

Figure 2:
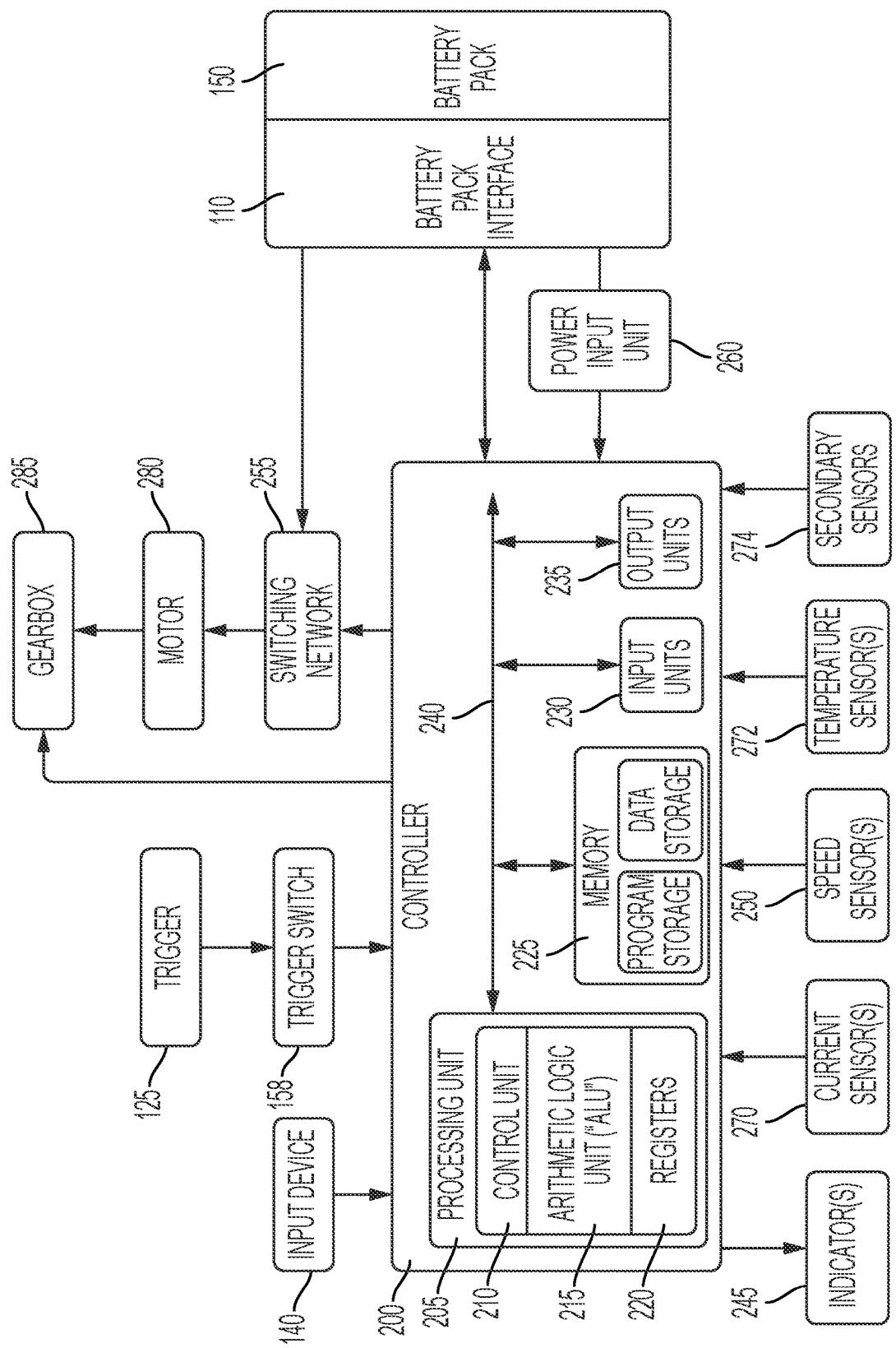
FIG. 2 illustrates a block diagram of a controller for the power tool of FIG. 1 in accordance with embodiments described herein.

A controller 200 for the power tool 100 is illustrated in FIG. 2. The controller 200 is electrically and/or communicatively connected to a variety of modules or components of the power tool 100. For example, the illustrated controller 200 is connected to indicators 245, a current sensor 270, a speed sensor 250, a temperature sensor 272, secondary sensor(s) 274 (e.g., a voltage sensor, an accelerometer, a torque sensor or torque transducer, etc.), the trigger 125 (via a trigger switch 158), a power switching network 255, and a power input unit 260.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 280 to rotate the driver 115 in response to a user's actuation of the trigger 125. The driver 115 may be coupled to the motor 280 via an output shaft 1400 (shown in FIGS. 14A and 14B). Depression of the trigger 125 actuates a trigger switch 158, which outputs a signal to the controller 200 to drive the motor 280, and therefore the driver 115. In some embodiments, the controller 200 controls the power switching network 255 (e.g., a FET switching bridge) to drive the motor 280. For example, the power switching network 255 may include a plurality of high side switching elements (e.g., FETs) and a plurality of low side switching elements. The controller 200 may control each FET of the plurality of high side switching elements and the plurality of low side switching elements to drive each phase of the motor 280. For example, the power switching network 255 may be controlled to more quickly deaccelerate the motor 280. In some embodiments, the controller 200 monitors a rotation of the motor 280 (e.g., a rotational rate of the motor 280, a velocity of the motor 280, a position of the motor 280, and the like) via the speed sensor 250. The motor 280 may be configured to drive a gearbox 285 (e.g., a mechanism). In some implementations, the controller 200 is configured to set a gear ratio of the gears within the gearbox 285, as described below in more detail.

The indicators 245 are also connected to the controller 200 and receive control signals from the controller 200 to turn on and off or otherwise convey information based on different states of the power tool 100. The indicators 245 include, for example, one or more light-emitting diodes (LEDs), or a display screen. The indicators 245 can be configured to display conditions of, or information associated with, the power tool 100. For example, the indicators 245 can display information relating to an operational state of the power tool 100, such as a mode or speed setting. The indicators 245 may also display information relating to a fault condition, or other abnormality of the power tool 100. In addition to or in place of visual indicators, the indicators 245 may also include a speaker or a tactile feedback mechanism to convey information to a user through audible or tactile outputs. In some embodiments, the indicators 245 display information related to a braking operation or a clutch operation (e.g., an electronic clutch operation) of the controller 200. For example, one or more LEDs are activated when the controller 200 is performing a clutch operation. In some embodiments, the indicators 245 display information related to a selected gear ratio of the gearbox 285.

The battery pack interface 110 is connected to the controller 200 and is configured to couple with a battery pack 150. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 150. The battery pack interface 110 is coupled to the power input unit 260. The battery pack interface 110 transmits the power received from the battery pack 150 to the power input unit 260. The power input unit 260 includes active and/or passive components (e.g., voltage step-down controllers, voltage converters, rectifiers, filters, etc.) to regulate or control the power received through the battery pack interface 110 and to the controller 200. In some embodiments, the battery pack interface 110 is also coupled to the power switching network 255. The operation of the power switching network 255, as controlled by the controller 200, determines how power is supplied to the motor 280.

The current sensor 270 senses a current provided by the battery pack 150, a current associated with the motor 280, or a combination thereof. In some embodiments, the current sensor 270 senses at least one of the phase currents of the motor. The current sensor 270 may be, for example, an inline phase current sensor, a pulse-width-modulation-center-sampled inverter bus current sensor, or the like. The speed sensor 250 senses a speed of the motor 280. The speed sensor 250 may include, for example, one or more Hall effect sensors. In some embodiments, the temperature sensor 272 senses a temperature of the switching network 255, the battery pack 150, the motor 280, the gearbox 285, or a combination thereof. The input device 140 is operably coupled to the controller 200 to, for example, select a forward mode of operation, a reverse mode of operation, a torque setting for the power tool 100, a gear ratio of the gearbox 285, and/or a speed setting for the power tool 100 (e.g., using torque and/or speed switches), etc. In some embodiments, the input device 140 includes a combination of digital and analog input or output devices required to achieve a desired level of operation for the power tool 100, such as one or more knobs, one or more dials, one or more switches, one or more buttons, etc. In other embodiments, the input device 140 is configured as a ring (e.g., a torque ring). Movement of the input device 140 sets a desired torque and/or desired a speed value at which to drive the motor 280.

Motor and Electronic Clutch Controls

Figure 3:
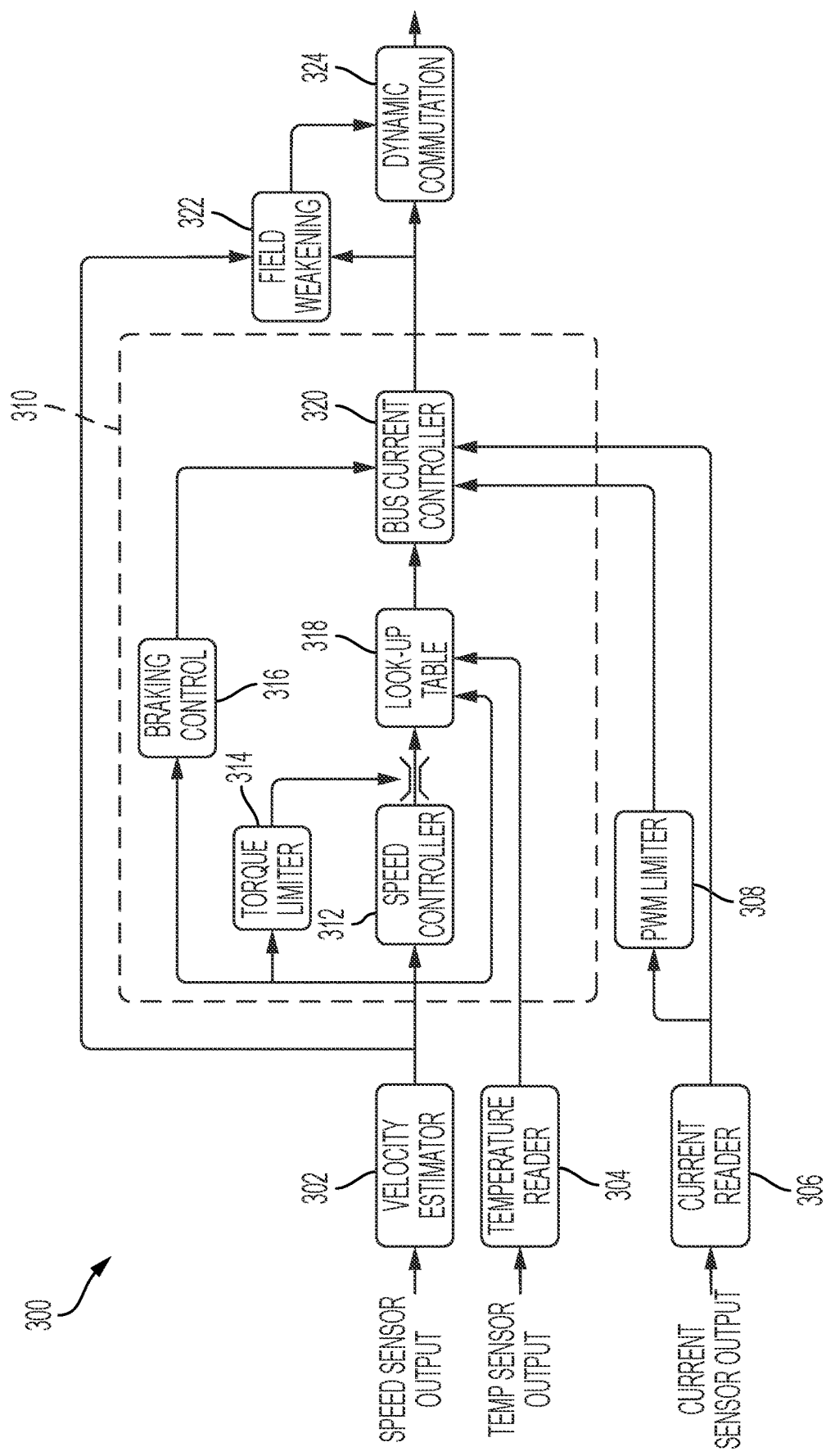
FIG. 3 illustrates a block diagram of a control architecture implemented by the controller of FIG. 2 in accordance with embodiments described herein.

The controller 200 is configured to monitor operating characteristics of the power tool 100 to drive the motor 280. For example, FIG. 3 provides a block diagram of a control architecture 300 implemented by the controller 200. The control architecture 300 includes, among other things, a velocity estimator module 302, a temperature reader module 304, a current reader module 306, a pulse width modulation (PWM) limiter 308, a field weakening module 322, a dynamic commutation module 324, and a driving algorithm 310. The driving algorithm 310 includes, among other things, software and applications used to drive the motor 280, such as a speed controller 312, a torque limiter module 314, a braking control module 316, look-up table 318, and a bus current controller 320. The control architecture 300 of FIG. 3 is merely an example. In other embodiments, functions of the various modules and controllers may be combined or separated into additional modules.

The velocity estimator module 302 receives speed signals from the speed sensor 250 indicative of a speed or velocity of the motor 280. The velocity estimator module 302 converts the received speed signal to a speed value or velocity value that is then provided to the driving algorithm 310. In some embodiments, the speed signals from the speed sensor 250 are provided directly to the driving algorithm 310.

In some embodiments, the velocity estimator module 302 determines (or estimates) the speed or velocity of the motor 280 based on current signals from the current sensor 270. For example, the velocity estimator module 302 converts received current signals to a speed value or velocity value that is then provided to the driving algorithm 310. In some embodiments, the velocity estimator module 302 determines the speed or velocity of the motor 280 based on a voltage of the motor 280 (as received from a voltage sensor included in the secondary sensors 274).

The temperature reader module 304 receives temperature signals from the temperature sensor 272 indicative of a temperature of the power tool 100. For example, the temperature reader module 304 receives temperature signals indicative of a temperature of the gearbox 285. In some embodiments, the temperature reader module 304 receives temperature signals indicative of a temperature of the motor 280 and/or the switching network 255. The temperature reader module 304 converts the temperature signal to a temperature value that is then provided to the driving algorithm 310. The driving algorithm 310 then selects a torque value at which to drive the motor 280 based on the temperature value. In some embodiments, the temperature signals from the temperature sensor 272 are provided directly to the driving algorithm 310. The temperature signals may be used by the driving algorithm 310 to improve torque repeatability over a wide temperature range.

The current reader module 306 receives current signals from the current sensor 270 indicative of the current of the motor 280. The current reader module 306 converts the received current signal to a current value (e.g., a voltage indicative of the current) that is then provided to the driving algorithm 310. In some embodiments, the current signals from the current sensor 270 are provided directly to the driving algorithm 310.

The PWM limiter 308 receives the current of the motor 280 from the current reader module 306. The PWM limiter 308 limits the maximum PWM ratio command used to drive the motor 280 to prevent low voltage conditions on the switching network 255 (e.g., gate drivers). The PWM ratio command limit is provided to the bus current controller 320.

Embodiment described herein primarily refer to the bus current controller 320 receiving current signals from current reader module 306. However, in some instances, the control architecture 300 may refer to direct torque measurements instead of current measurements. For example, the control architecture 300 may include a torque reader module that receives torque signals from a torque sensor (for example, a torque transducer) included in the secondary sensor(s) 274. The torque signals are indicative of a torque of the motor 280 and/or an output torque of the power tool. The torque reader module converts the received torque signal to a torque value (e.g., a voltage indicative of the torque) that is then provided to the driving algorithm 310. Additionally, the PWM limiter 308 receives the torque value from the torque reader module. The PWM limiter 308 limits the maximum PWM ratio command used to drive the motor 280 based on the torque value from the torque reader module. The PWM ratio command limit is provided to the bus current controller 320 (which, in this instance, may instead be referred to as a torque controller).

Figure 4:
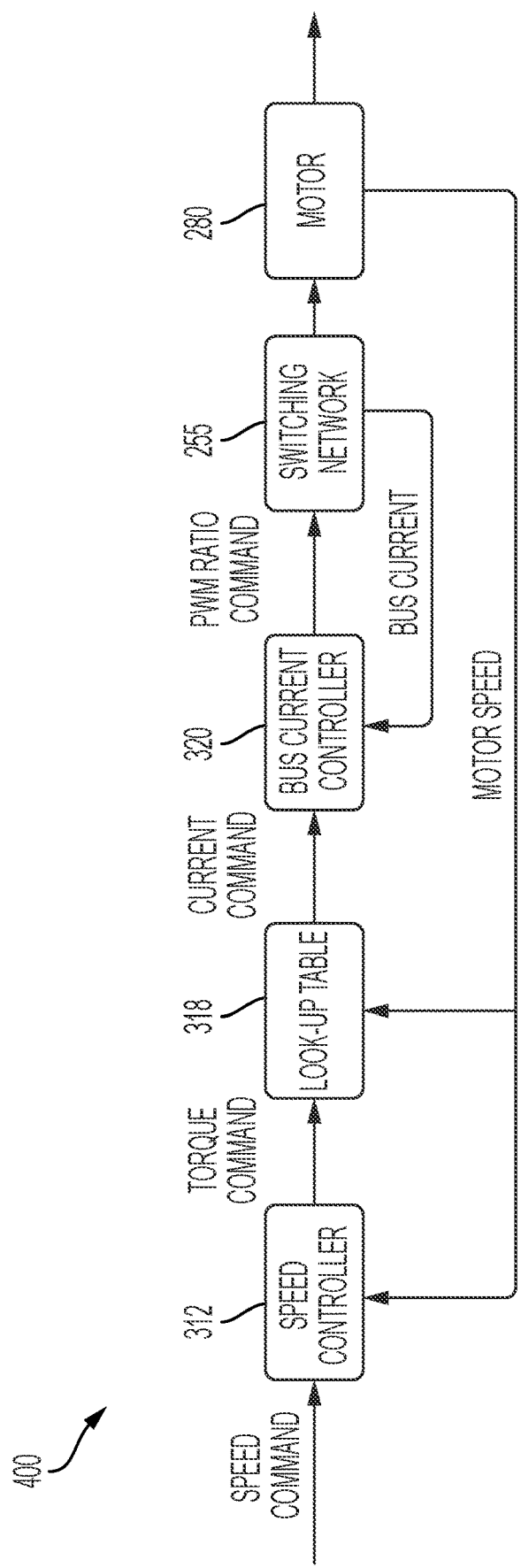
FIG. 4 illustrates a block diagram of a control block included in the control architecture of FIG. 3 in accordance with embodiments described herein.

FIG. 4 provides a block diagram of a control block 400 for control of the motor 280. The speed controller 312 receives the motor speed or velocity from the velocity estimator module 302. Additionally, the speed controller 312 receives a speed command. For example, a distance at which the trigger 125 is actuated may be associated with a desired speed of the motor 280, and a corresponding speed command signal is generated. In such examples, the controller 200 translates the distance at which the trigger 125 is actuated to a speed command used to control the motor 280. The speed controller 312 compares the motor speed provided by the velocity estimator module 302 with the speed command to determine a torque at which to drive the motor 280. For example, if the motor speed is less than the speed command, the speed controller 312 outputs a torque command (e.g., a torque value) to increase the speed of the motor 280. If the motor speed is greater than the speed command, the speed controller 312 outputs a torque command to decrease the speed of the motor 280. If the motor speed is equal to the speed command, the speed controller 312 outputs a torque command to maintain the speed of the motor 280.

The torque command and the motor speed are provided to the look-up table 318. The torque command and the motor speed are compared to the look-up table 318 (e.g., a torque-current look-up table, a torque-speed-current look-up table, a speed-current look-up table) to determine a current command, such as an electric current value or bus current value at which to drive the motor 280. The current command is a current required to produce the desired torque. The current command can be determined using the torque command and the motor speed. The current command is provided to the bus current controller 320. The bus current controller 320 then compares the current command to the measured bus current (e.g., the measured current of the motor 280 as provided by the current reader module 306). The bus current controller 320 drives the switching network 255 with a PWM ratio command (e.g., a PWM duty cycle ratio command) based on this comparison. For example, if the current command is less than the measured bus current, the bus current controller 320 decreases the PWM duty cycle at which the switching network 255 is driven. If the current command is greater than the measured bus current, the bus current controller 320 increases the PWM duty cycle at which the switching network 255 is driven. If the current command is equal to the measured bus current, the bus current controller 320 maintains the PWM duty cycle at which the switching network 255 is driven.

Figure 5:
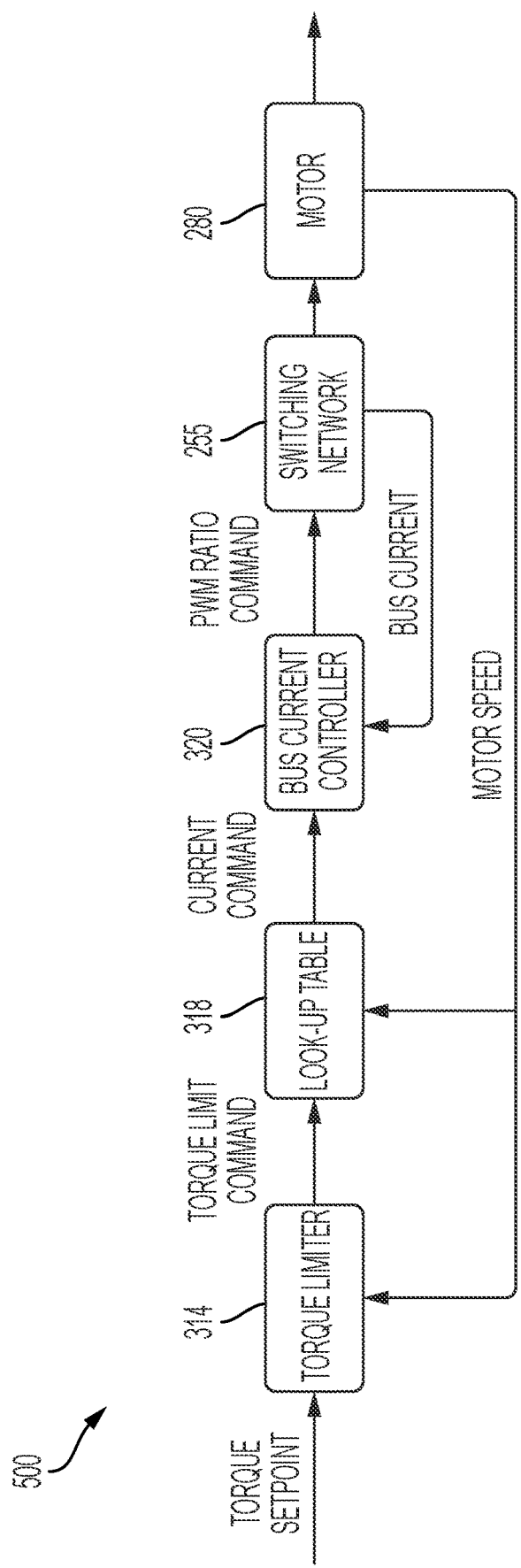
FIG. 5 illustrates a block diagram of another control block included in the control architecture of FIG. 3 in accordance with embodiments described herein.

In some embodiments, the torque limiter module 314 limits the torque command provided by the speed controller 312. FIG. 5 provides a block diagram of a control block 500 for limiting the torque command. A torque setpoint is provided to the torque limiter module 314. For example, the torque setpoint may be provided by the input device 140.

The torque limiter module 314 limits the torque based on, for example, an estimated absorption energy of the motor 280. The absorption energy is estimated based on the principle of balancing the mechanical flywheel energy of the motor 280 and the gearbox 285 with the available absorption energy of a driven fastener upon hitting a joint (e.g., being seated). In one example, upon the onset of a joint, the motor torque remains constant, as the controller 200 actively controls current at a high bandwidth.

Figure 6A:
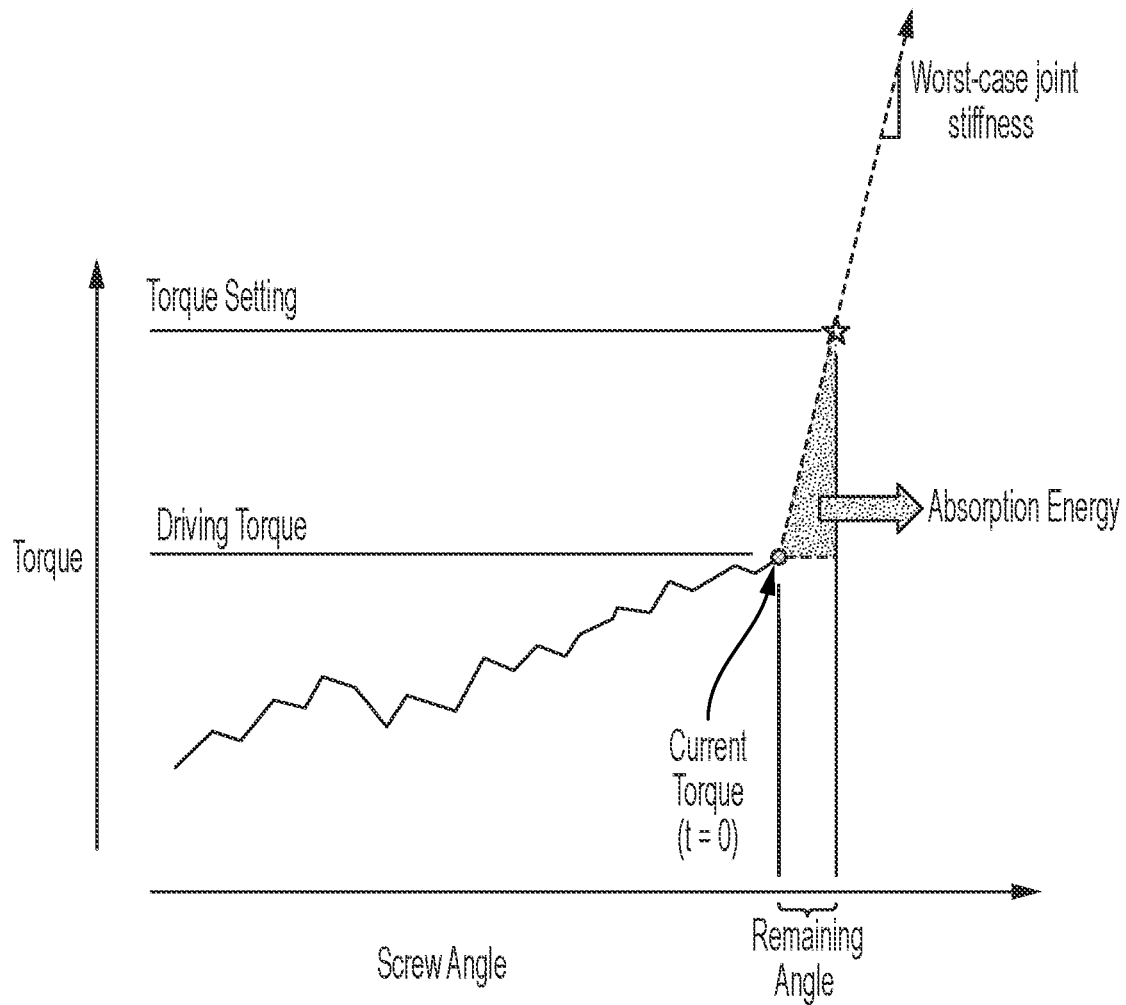
FIGS. 6A-6B illustrate graphs for measuring the absorption energy of a motor in accordance with embodiments described herein.

The absorption energy of the fastener is the integral of torque with respect to angle, and the net absorption energy of the fastener is the absorption energy minus the energy delivered by the torque of the motor 280. FIG. 6A provides an example of the absorption energy when the motor torque remains constant after joint. Equation 1 provides the absorption energy balanced with the flywheel energy:

$$\frac{1}{2}J\omega^2 = \frac{(T_s - T_d)^2}{2k_{joint}} \quad \text{[Equation 1]}$$

where:
J—drill reflected inertia from the perspective of the motor (kg-m$^2$)
$\omega$—motor velocity (rad/s)
$T_s$—torque setpoint (Nm)
$T_d$—driving torque or load torque (Nm)
$k_{joint}$—joint stiffness (Nm/rad)

When the torque limit is set to the driving torque, Equation 1 can be rearranged such that the torque limit is set based on the motor speed, the torque setpoint, drill inertia, and joint stiffness, as shown in Equation 2:

$$T_{limit} = T_d = T_s - \sqrt{Jk_{joint}}\,\omega \quad \text{[Equation 2]}$$

where:
$T_{limit}$—torque limit (Nm)

Figure 6B:
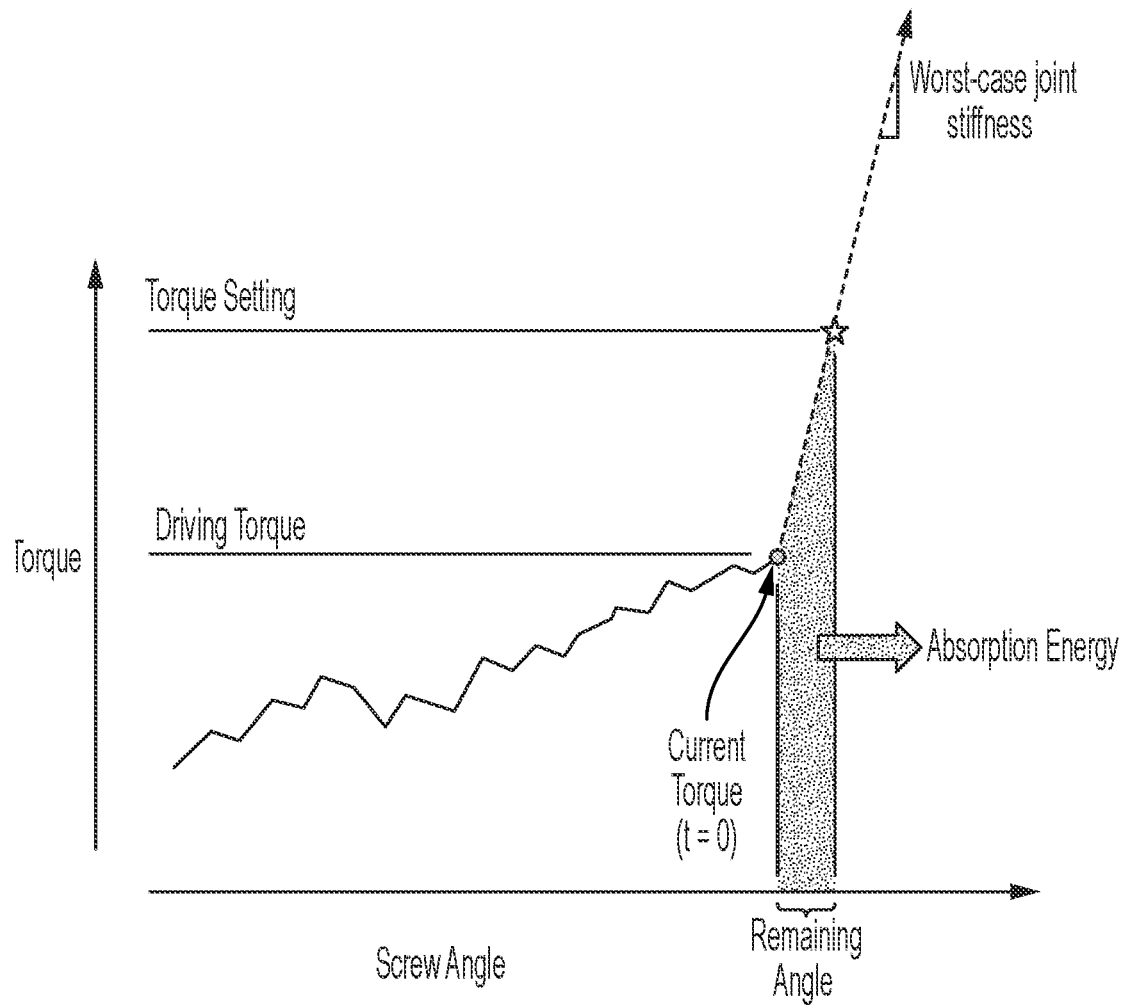

In another example, all of the absorption energy of a fastener's joint is used to stop the motor 280. Accordingly, the motor 280 is de-energized the instant a joint is reached, and negative torque is introduced in applying a brake. FIG. 6B provides an example of the absorption energy when the motor 280 is de-energized. Equation 3 provides the absorption energy balanced with the flywheel energy.

$$\frac{1}{2}J\omega^2 = \frac{T_s^2 - T_d^2}{2k_{joint}} \quad \text{[Equation 3]}$$

When the torque limit is set to the driving torque, Equation 3 can be rearranged such that the torque limit is set based on the motor speed, the torque setpoint, drill inertia, and joint stiffness, as shown in Equation 4:

$$T_{limit} = T_d = \sqrt{T_s^2 - Jk_{joint}\omega^2} \quad \text{[Equation 4]}$$

Returning to FIG. 3, if the torque command is greater than the torque limit, the torque limit is instead provided to the look-up table 318. Control of the motor 280 is then continued using the torque limit as the torque command, as shown in FIG. 5.

Figure 7:
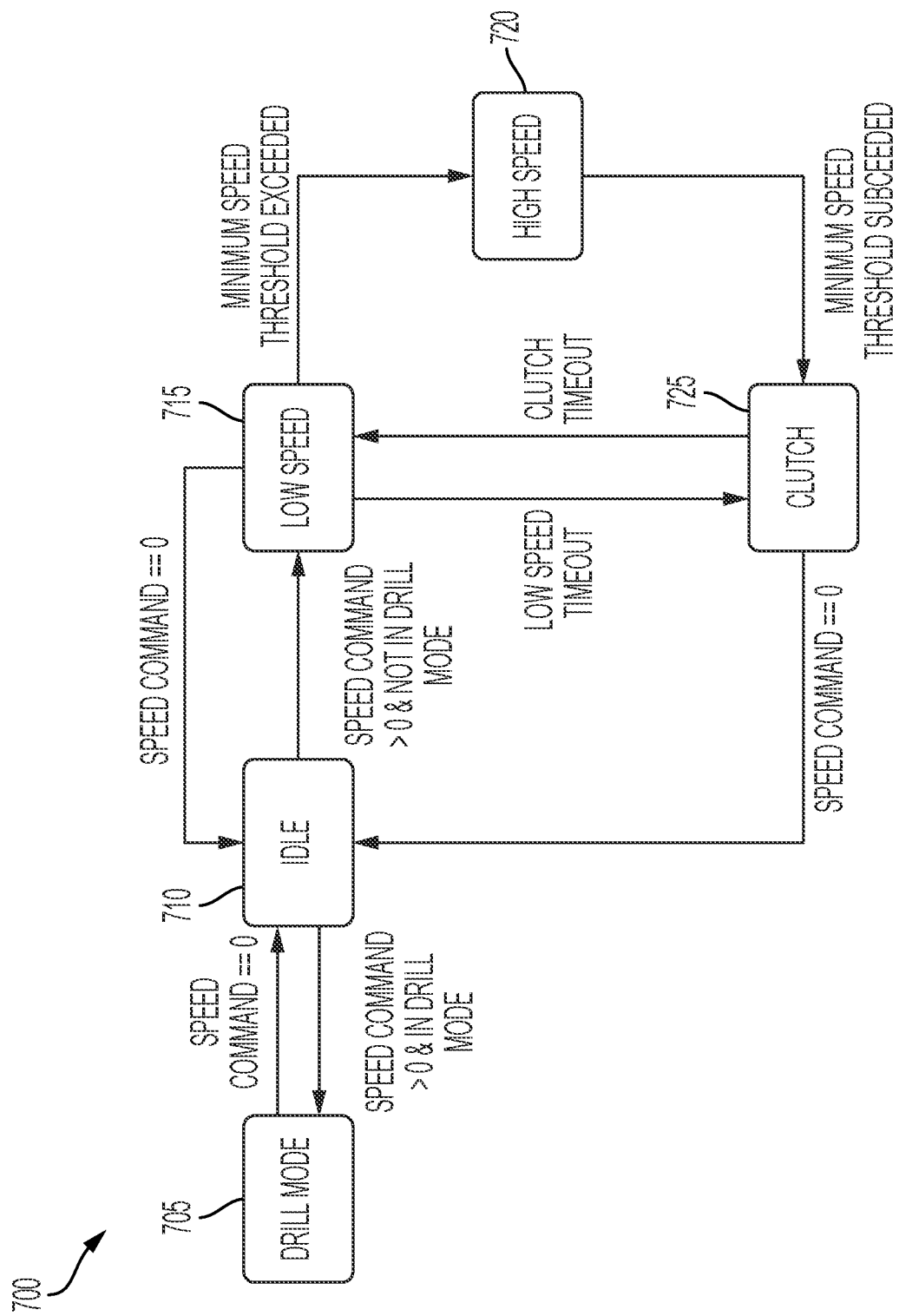
FIG. 7 illustrates a state machine block diagram for an electronic clutch in accordance with embodiments described herein.

In some embodiments, the PWM ratio command provided by the bus current controller 320 is overridden by the braking control module 316. For example, based on the motor speed provided by the velocity estimator module 302, the braking control module 316 may determine to brake the motor 280. FIG. 7 provides a state diagram 700 illustrating operation of the power tool 100, as performed by the controller 200.

When the speed command of the motor 280 is set to 0 (e.g., when the trigger 125 is not actuated), the controller 200 is in an idle mode (block 710). When in the idle mode, the controller 200 monitors for actuation of the trigger 125, and the switching network 255 is placed in a high impedance state to prevent power transfer from the battery pack 150 to the motor 280. When the trigger 125 is actuated (e.g., the speed command is greater than 0), the controller 200 determines whether the power tool 100 is in a drill mode. When in a drill mode, the controller 200 proceeds to block 705. In the drill mode, the speed of the motor 280 is controlled at the maximum torque limit of the motor 280. The maximum torque limit of the motor 280 may be, for example, stored in the memory 225, set by the input device 140, or the like. Drill mode may be set, for example, by the input device 140 on the power tool 100. In some embodiments, when in the drill mode, the torque limiter module 314 is disabled.

When the power tool 100 is not in a drill mode and the trigger 125 is actuated, the controller 200 proceeds to block 715 and operates the motor 280 according to a low speed mode (e.g., a first operating mode, a first speed setting). The low speed mode may be, for example, an operating mode associated with beginning of driving the motor 280 when the motor 280 was fully stopped. While in the low-speed mode, the controller 200 monitors the speed of the motor 280 as provided by the velocity estimator module 302. In some embodiments, while in the low-speed mode, the speed controller 312 is bypassed, and the motor 280 is controlled such that the torque output of the speed controller 312 is equal to the torque setpoint. If the speed of the motor 280 increases above or equal to a minimum speed threshold, the controller 200 proceeds to block 720. In some embodiments, the minimum speed threshold has a value of between 500 rotations per minute ("RPM") and 3000 RPM. In some embodiments, the minimum speed threshold has a value of approximately 1800 RPM. However, if the speed of the motor 280 remains below the minimum speed threshold for a low speed timeout period (e.g., a first predetermined time period), the controller 200 instead proceeds to block 725. If the speed command is set to zero (0) at any point (e.g., the trigger 125 is de-actuated), the controller 200 transitions back to the idle mode (block 710).

When the speed of the motor 280 exceeds or is equal to the minimum speed threshold, the controller 200 proceeds to block 720 and operates in a high speed mode (e.g., a second operating mode, a second speed setting). While in the high speed mode, the controller 200 drives the motor 280 according to received speed commands while within the set torque limits. The speed controller 312 is active, and the torque limiter module 314 may limit the torque output of the speed controller 312, which may reduce speed for clutch settings or when a significant load is applied. For example, when a high load state is detected based on the speed of the motor 280, the torque output of the speed controller 312 is limited.

When the speed of the motor 280 drops below the minimum speed threshold while operating in the high speed mode, the controller 200 proceeds to block 725 and operates in a clutch mode. In some embodiments, hysteresis can be used such that different speed thresholds are used to control transitions from the low speed mode to the high speed mode and the high speed mode to the clutch mode. Additionally, when the controller 200 operates in the low speed mode (block 715) for a predetermined time period, the controller 200 proceeds to block 725 and operates in the clutch mode. While in the clutch mode, the controller 200 limits the current of the motor 280. For example, the current command provided to the bus current controller 320 by the look-up table 318 is overwritten by a low current command. In some embodiments, the low current command corresponds to a current value low enough to maintain engagement of the motor 280 with the geartrain, but does not overcome geartrain friction. This results in a zero torque value of the driver 115, and emulates the sound a mechanical clutch makes when engaged (e.g., a ratcheting sound caused by switching between the low speed mode and the clutch mode). The low current command is maintained for a clutch timeout period, at which point the controller 200 returns to block 715 and operates in the low speed mode. If the trigger 125 is de-actuated while the controller 200 is in the clutch mode, the controller 200 returns to block 710 and operates in the idle mode. Additionally, in some instances, due to the clutch timeout period and the low speed timeout period, the controller 200 may alternate between the low speed mode at block 715 and the clutch mode at block 725 indefinitely (i.e., making the ratcheting sound) until the trigger 125 is de-actuated. In some embodiments, the clutch timeout period and the low speed timeout period have values between 5 milli-seconds and 100 milli-seconds. In some embodiments, the clutch timeout period and the low speed timeout period have values of approximately 35 milli-seconds.

Returning to FIG. 3, the field weakening module 322 is configured to improve torque capability at high speeds when the back-electromotive force ("EMF") of the motor 280 causes the drive to become voltage limited. Field weakening may be applied by identifying the relationship between motor current, motor torque, and motor speed at a steady state. This relationship may be used to correct nominal field weakening. In some embodiments, the field weakening module 322 is disabled.

Figure 8:
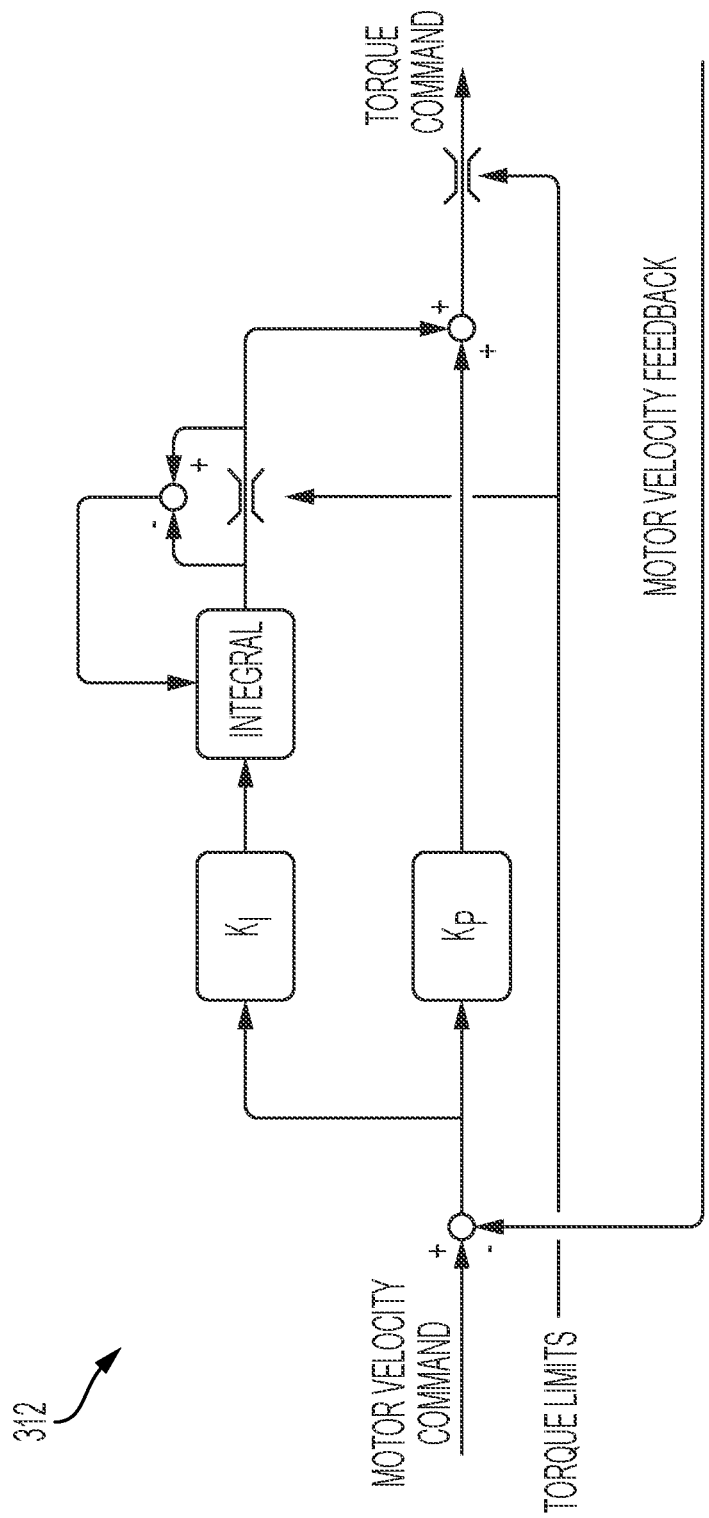
FIG. 8 illustrates a block diagram of a speed controller in accordance with embodiments described herein.

FIG. 8 illustrates an example block diagram of the speed controller 312. Equation 5 provides an example model for determining a torque command based on the motor speed:

$$T_C + b\omega + J\frac{d\omega}{dt} = T_{drive} \quad \text{[Equation 5]}$$

Equation 6 provides a simplified transfer function of the model of Equation 5:

$$\frac{\Omega(s)}{T_{drive}(s)} = \frac{1}{Js + b} \quad \text{[Equation 6]}$$

The torque command output by the speed controller 312 is locked to the upper torque limit any time the controller 200 is operating in the low speed mode. When the controller 200 is in the clutch mode, the torque command is overwritten downstream. However, the speed controller 312 continues operation. The illustrated speed controller 312 includes two gains: a proportional gain $K_P$ and an integral gain $K_I$.

Figure 9:
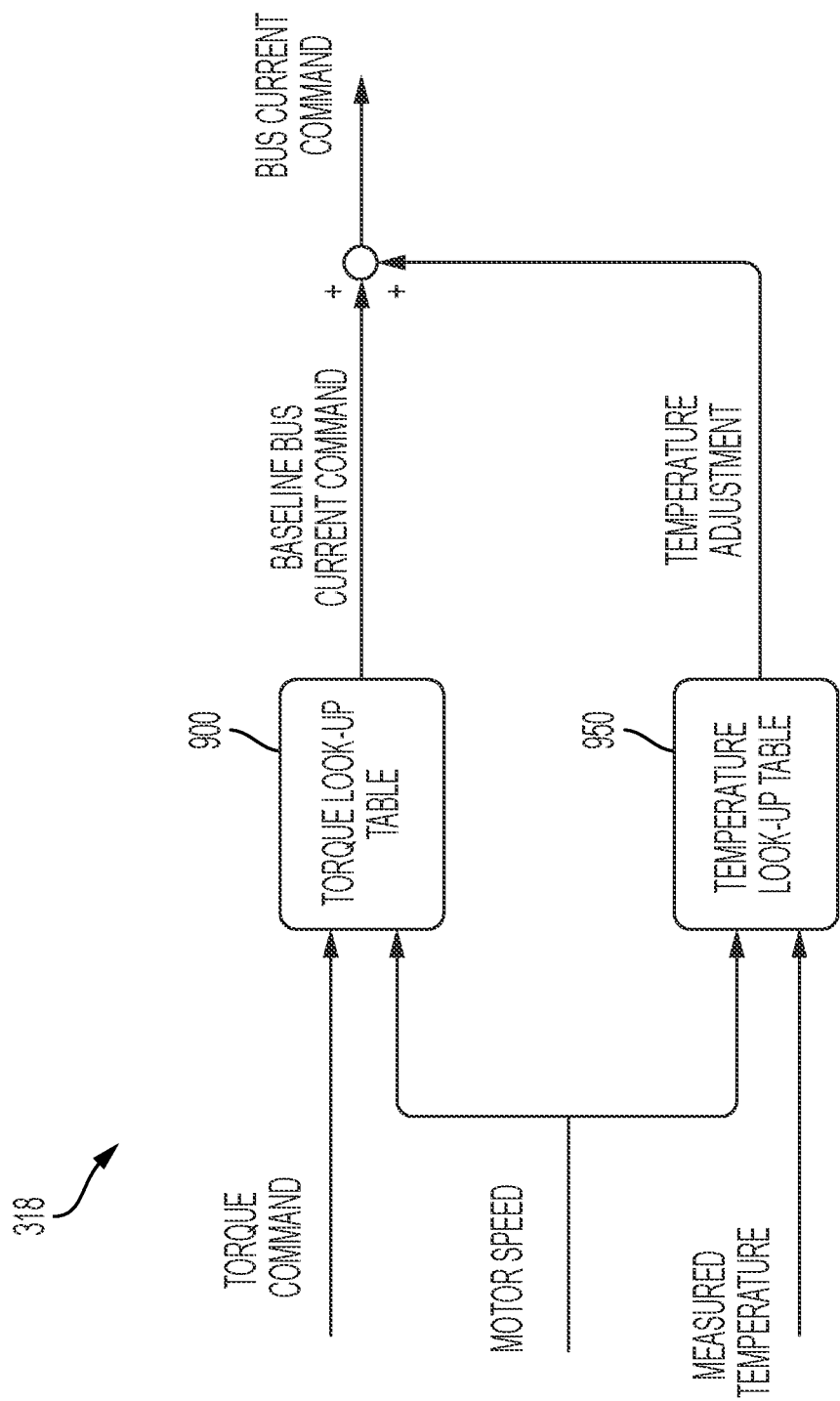
FIG. 9 illustrates a block diagram of a look-up table operation in accordance with embodiments described herein.

FIG. 9 illustrates an example block diagram of the look-up table 318. The torque command from the speed controller 312 is compared to the motor speed at a torque look-up table 900. The torque look-up table 900 (e.g., a torque-velocity-current look-up table) outputs a baseline bus current command. Additionally, the motor speed is compared to the measured temperature, as provided by the temperature reader module 304, at a temperature look-up table 950. The output of the temperature look-up table 950 is a temperature adjustment output. The temperature adjustment output is applied to the baseline bus current command to create the bus current command provided to the bus current controller 320.

In some embodiments, rather than using the look-up table 318, the torque command is converted to the bus current command using a slope-intercept method. The slope-intercept method converts torque to current independent of the motor speed and the temperature. For a given gear ratio, a slope and an intercept are provided to convert the torque to a current command.

Figure 10:
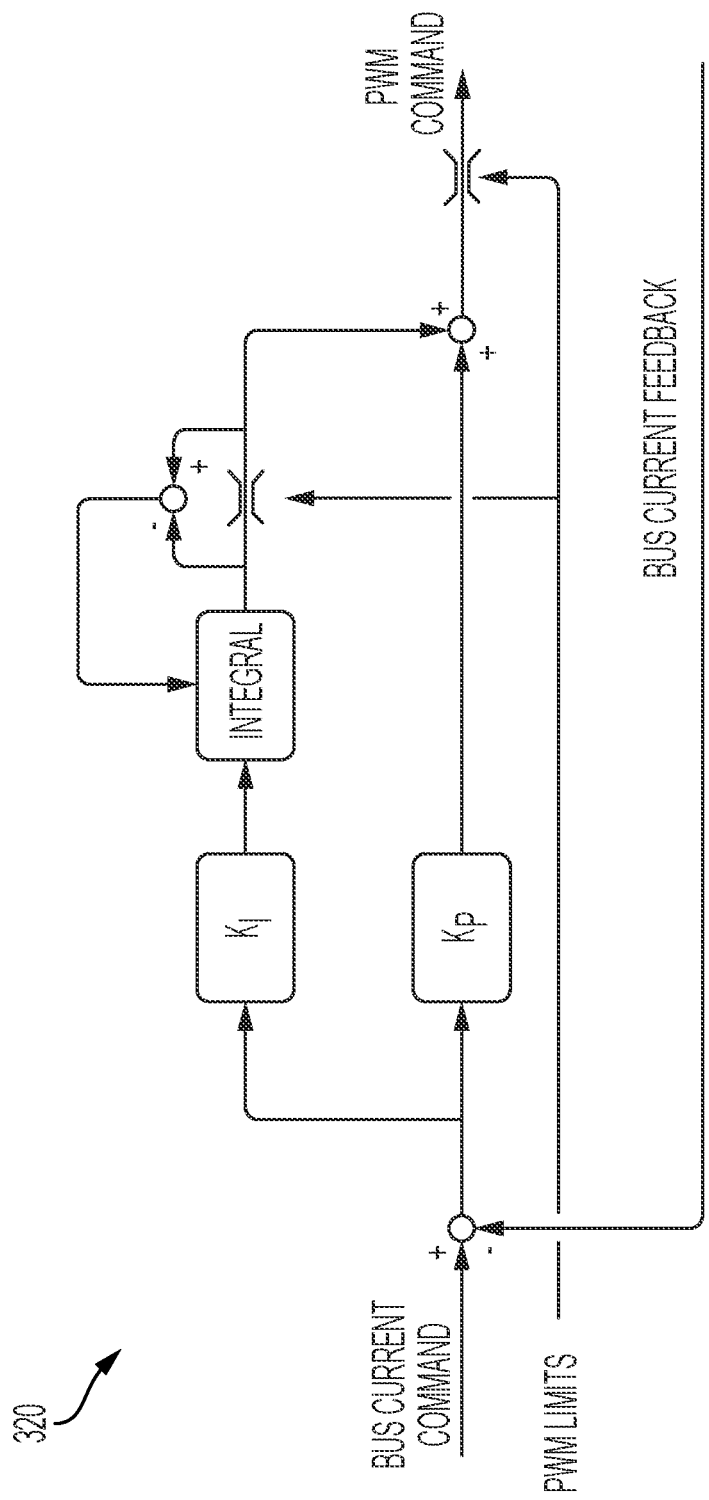
FIG. 10 illustrates a block diagram of a bus current controller in accordance with embodiments described herein.

FIG. 10 illustrates an example block diagram of the bus current controller 320. The bus current controller 320 outputs a PWM ratio command signal based on the bus current command from the look-up table 318. Equation 7 provides an example model for determining a PWM ratio command signal based on the bus current:

$$R_{eq} i_{batt} + L_{eq} \frac{di_{batt}}{dt} + K_e \omega = V_{batt} d_{PWM} \qquad \text{[Equation 7]}$$

If velocity is constant relative to the electrodynamics and the battery voltage is constant, the model of Equation 7 becomes a transfer function defined by Equation 8:

$$\frac{I_{batt}(s)}{d_{PWM}(s)} = V_{batt} \frac{1}{L_{eq} s + R_{eq}} \qquad \text{[Equation 8]}$$

When the controller 200 is operating in the low speed mode, the high speed mode, or the drill mode, the bus current controller 320 operates normally. When in the idle mode or when braking, the PWM ratio command output is overridden to zero. When in the clutch mode, the bus current command is overridden to another value to overcome cogging torque and reduce system backlash. Additionally, in some embodiments, when transitioning from the clutch mode to the low speed mode, the PWM ratio command is overwritten to a value that increases drill jerk to improve drill end indication user experience. Additionally, the bus current controller 320 may limit the PWM ratio command output to prevent bus current overshoot (e.g., an overcurrent condition). The illustrated bus current controller 320 includes two gains: a proportional gain $K_P$ and an integral gain $K_I$.

Figure 11:
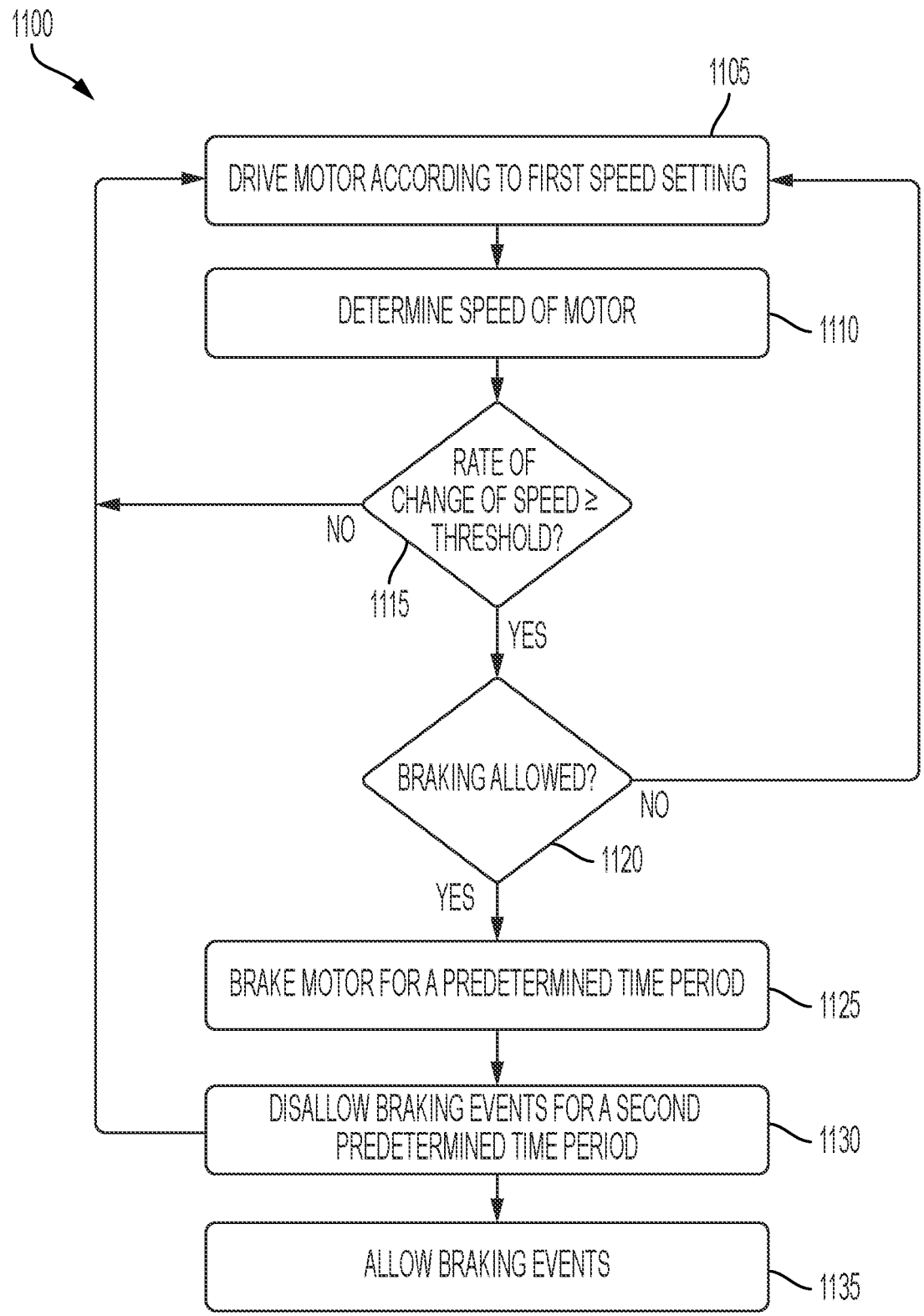
FIG. 11 illustrates a block diagram of a method performed by the controller of FIG. 2 in accordance with embodiments described herein.

FIG. 11 provides a method 1100 for controlling the motor 280. The method 1100 may be performed by the controller 200. At block 1105, the controller 200 drives the motor 280 according to a first speed setting. For example, the controller 200 drives the motor 280 according to the high speed mode while receiving a speed command from the trigger 125. At block 1110, the controller 200 determines the speed of the motor 280. For example, in some embodiments, the controller 200 receives speed signals from the speed sensor 250 indicative of the speed of the motor 280. In other embodiments, the controller 200 determines the speed of the motor 280 based on current signals from the current sensor 270.

At block 1115, the controller 200 determines whether a rate of change of the speed of the motor 280 is greater than or equal to a speed drop threshold (e.g., a speed rate of change threshold, rate of speed loss threshold, rate of speed reduction threshold, etc.). If the rate of change of the speed of the motor 280 is less than the speed drop threshold, the controller 200 returns to block 1105 and continues to drive the motor 280 according to the first speed setting. For example, the speed of the motor 280 experiences minor variations in speed. If the rate of change of the speed of the motor 280 is greater than or equal to the speed threshold (for example, a reduction in speed of 400-600 RPM over a 10 ms period of time), the controller 200 proceeds to block 1120. In some embodiments, the speed drop threshold corresponds to a change in rotations per minute ("RPM") of between 100 RPM and 2000 RPM during the first time period. In some embodiments, the speed drop threshold corresponds to a change in RPM of approximately 400 RPM during the first time period. In some embodiments, the controller 200 monitors the speed of the motor 280 over a first period of time to determine the rate of change, such as between 5 milliseconds and 100 milli-seconds. In some embodiments, the first period of time is approximately 10 milli-seconds.

At block 1120, the controller 200 determines whether braking of the motor 280 is allowed. For example, to prevent false braking triggers, braking of the motor 280 may be disallowed for a predetermined period of time after a braking event is completed, as braking causes deceleration of the motor that may result in a reduction of speed that satisfies the speed drop threshold a second time. By disallowing recurrent braking events, the controller 200 avoids false braking events. If braking events are not allowed, the controller 200 returns to block 1105 and continues to drive the motor 280 according to the first speed setting. If braking events are allowed, the controller 200 proceeds to block 1125. In some embodiments, braking events are not disallowed, and block 1120 (and blocks 1130 and 1135) may be removed from the method 1100.

At block 1125, the controller 200 brakes the motor 280 for a predetermined time period. For example, the controller 200 controls the switching network 255 to electronically brake the motor 280. Once the predetermined period of time is satisfied, the controller 200 disallows braking events (at block 1130) and returns to block 1105. The controller 200 disallows braking events for a second predetermined time period to prevent false braking triggers. Once the second predetermined time period is satisfied, the controller 200 allows braking events to be performed (at block 1135). In some embodiments, braking is disabled at low speeds (e.g., 2000 RPM or fewer).

Figure 12A:
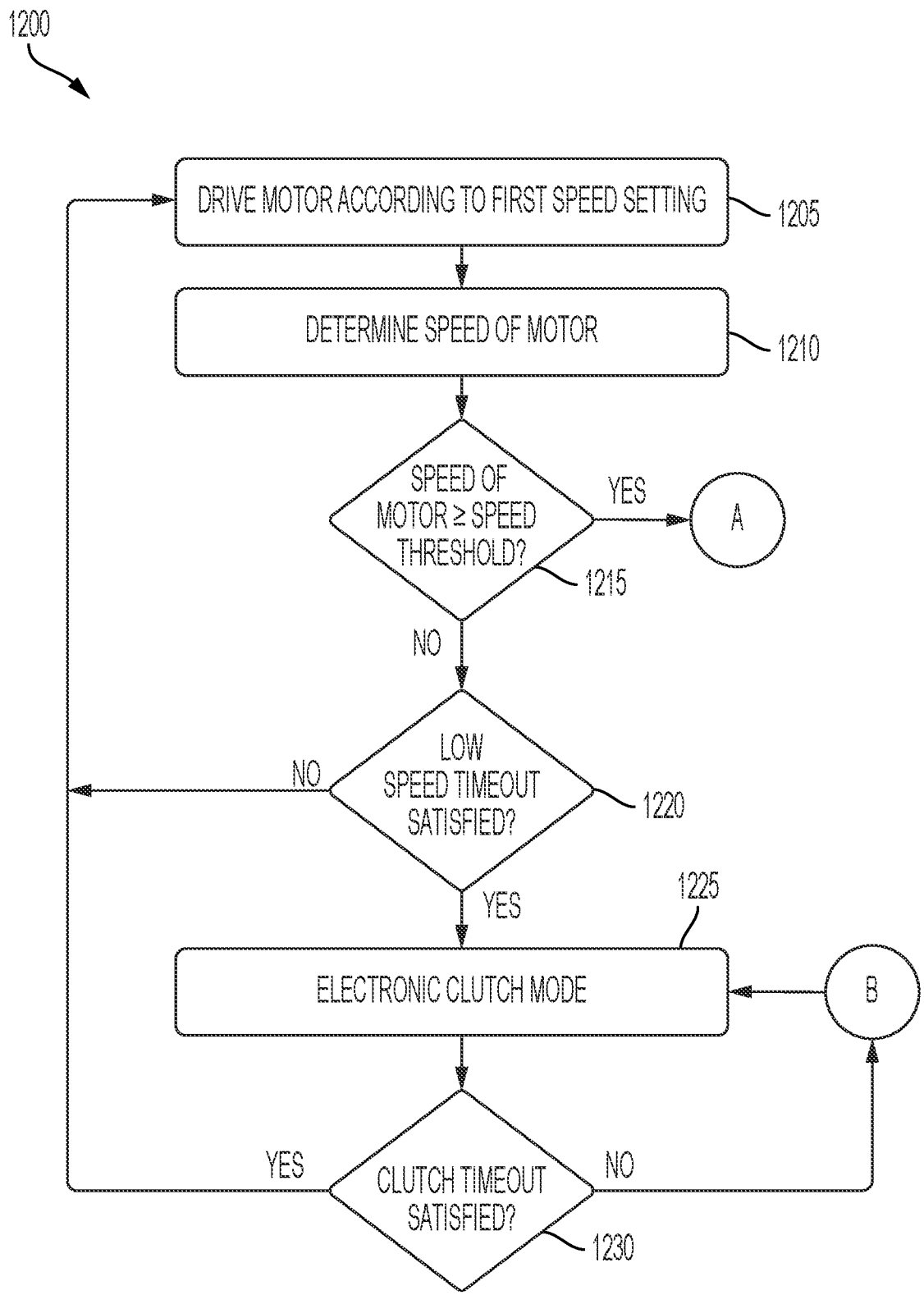
FIGS. 12A-12B illustrate a block diagram of another method performed by the controller of FIG. 2 in accordance with embodiments described herein.
Figure 12B:
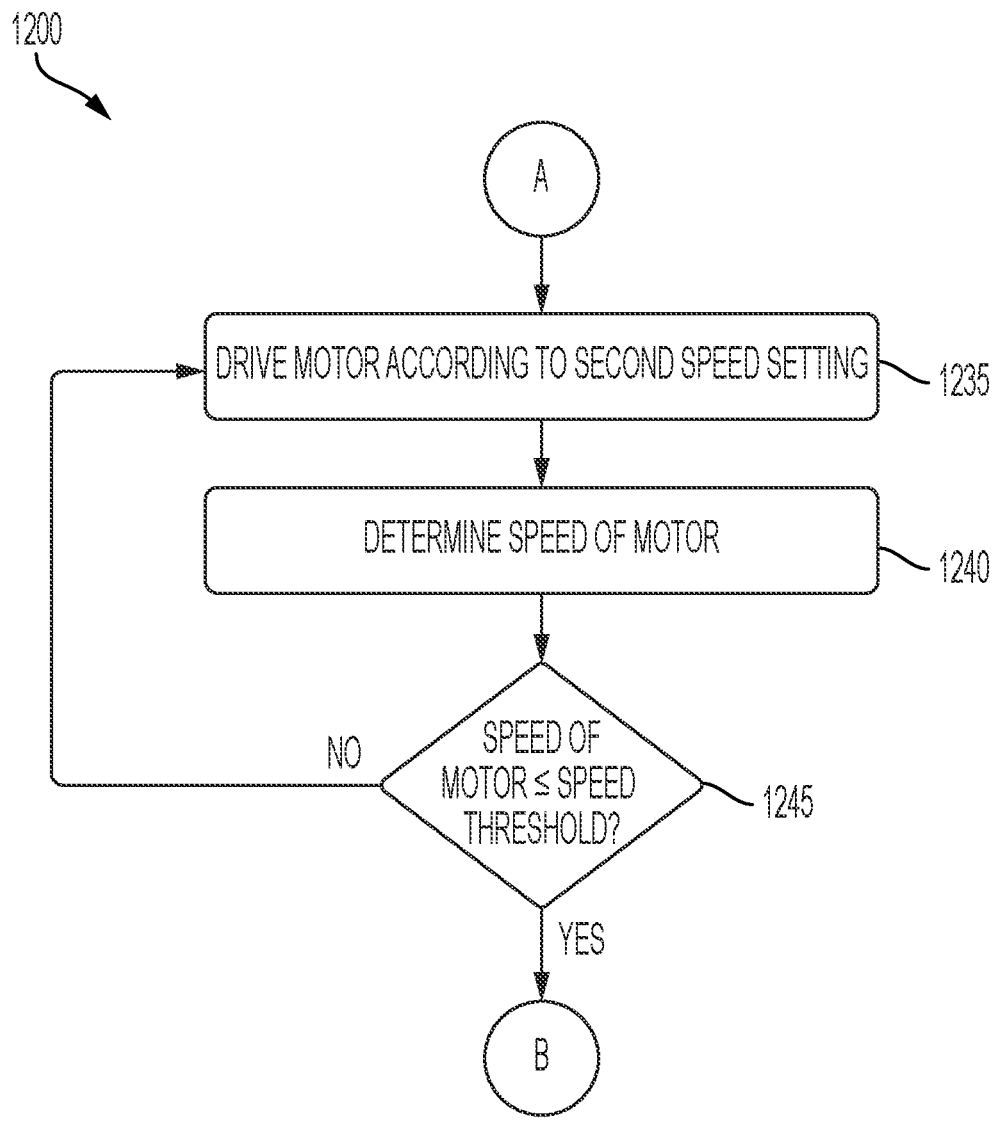

FIGS. 12A-12B provide a method 1200 for controlling the motor 280. The method 1200 may be performed by the controller 200. The method 1200 may be performed in parallel to the method 1100 of FIG. 11. At block 1205, the controller 200 drives the motor 280 according to a first speed setting. For example, the controller 200 drives the motor 280 according to the low speed mode while receiving a speed command from the trigger 125. At block 1210, the controller 200 determines the speed of the motor 280. For example, in some embodiments, the controller 200 receives speed signals from the speed sensor 250 indicative of the speed of the motor 280. In other embodiments, the controller 200 determines the speed of the motor 280 based on current signals from the current sensor 270.

At block 1215, the controller 200 determines whether the speed of the motor 280 is greater than or equal to a speed threshold. If the speed of the motor 280 is greater than or equal to the speed threshold, the controller 200 proceeds to block 1235 (see FIG. 12B). If the speed of the motor 280 is less than the speed threshold, the controller 200 determines whether the low speed timeout threshold has been satisfied (block 1220). If the low speed timeout threshold is not satisfied, the controller 200 returns to block 1205 and continues to drive the motor 280 according to the first speed setting.

If the low speed timeout threshold is satisfied, the controller 200 proceeds to block 1225 and enters the electronic clutch mode. In the electronic clutch mode, the controller 200 drives the motor 280 according to a low current command, as previously described. At block 1230, the controller 200 determines whether the clutch timeout period is satisfied. If the clutch timeout period is satisfied, the controller 200 returns to block 1205 and drives the motor 280 according to the first speed setting. If the clutch timeout period is not satisfied, the controller 200 returns to block 1225 and continues to operate in the electronic clutch mode. In some embodiments, the clutch timeout period corresponds to between 10 and 100 milli-seconds. In some embodiments, the clutch timeout period is approximately 35 milli-seconds.

Returning to block 1215, if the speed of the motor is greater than or equal to the speed threshold, the controller 200 proceeds to block 1235. At block 1235, the controller 200 drives the motor 280 according to a second speed setting. In some embodiments, the second speed setting is the high speed mode. At block 1240, the controller 200 determines the speed of the motor 280. For example, in some embodiments, the controller 200 receives speed signals from the speed sensor 250 indicative of the speed of the motor 280. In other embodiments, the controller 200 determines the speed of the motor 280 based on current signals from the current sensor 270.

At block 1245, the controller 200 determines whether the speed of the motor 280 is less than or equal to the speed threshold. If the speed of the motor 280 is greater than the speed threshold, the controller 200 continues to drive the motor 280 according to the second speed setting. If the speed of the motor 280 is less than or equal to the speed threshold, the controller 200 proceeds to block 1225 and enters the electronic clutch mode. For example, the method 1100 in FIG. 11 can cause a rapid slowdown of the motor 280 that causes the motor speed to become less than the speed threshold and the transition from the second speed setting to the electronic clutch mode.

Gear Ratio Controls

Figure 13:
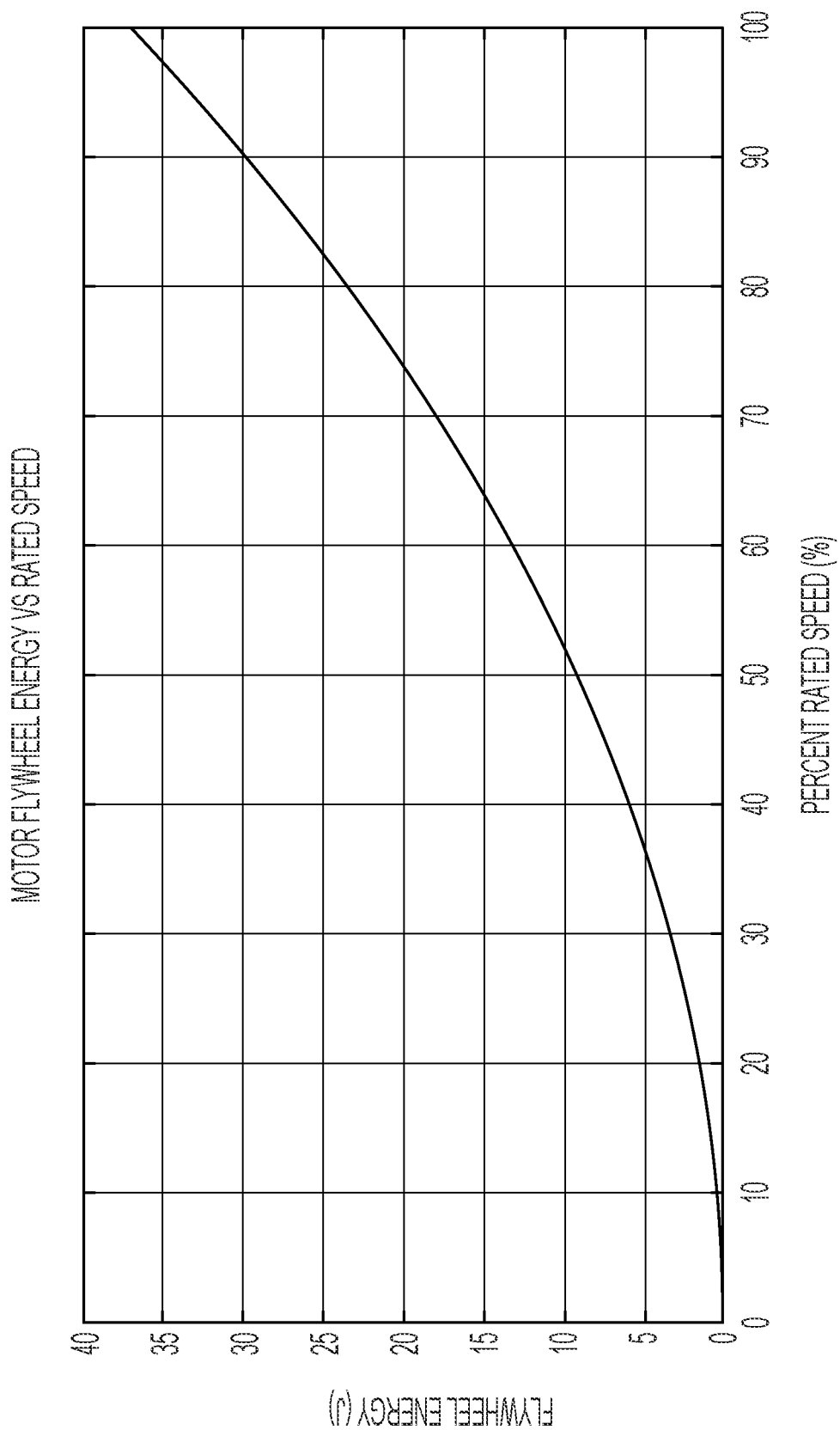
FIG. 13 illustrates a graph of the relationship between motor flywheel energy and a percent rated speed of the motor in accordance with embodiments described herein.

The flywheel energy of the motor 280 (such as that described with respect to and shown in FIG. 6A) is dependent on the speed of the motor 280. For example, FIG. 13 provides a graph illustrating the flywheel energy (in Joules) with respect to the percent rated speed of the motor 280. When in a low speed setting, the driver 115 spins at approximately 500 RPM and the motor is spinning at 100% of the rated speed. The resulting flywheel energy is approximately 37 Joules. However, when in the high speed setting, the driver spins at approximately 500 RPM and the motor is spinning at approximately 28% of the rated speed, resulting in a flywheel energy of approximately 3 Joules.

As shown in FIG. 6A, when driving a hard joint, the flywheel energy is transferred to the workpiece and the motor 280 is stopped from spinning. Higher flywheel energy means a greater energy is sent to the workpiece, resulting in a torque overshoot if the speed is not limited. In a high speed mode, speed output can be higher with less torque overshoot, resulting in faster fastening times for more sensitive applications and improved torque accuracies.

To reduce flywheel energy and reduce torque overshoot, the controller 200 may automatically select a gear ratio of the gearbox 285 based on settings of the electronic clutch, such as a speed setting (or speed limit) of the speed controller 312 and torque setting (or torque limit) of the torque limiter module 314. Specifically, the controller 200 can be configured to select a high gear ratio setting of the gearbox 285 in low torque applications.

Figure 14A:
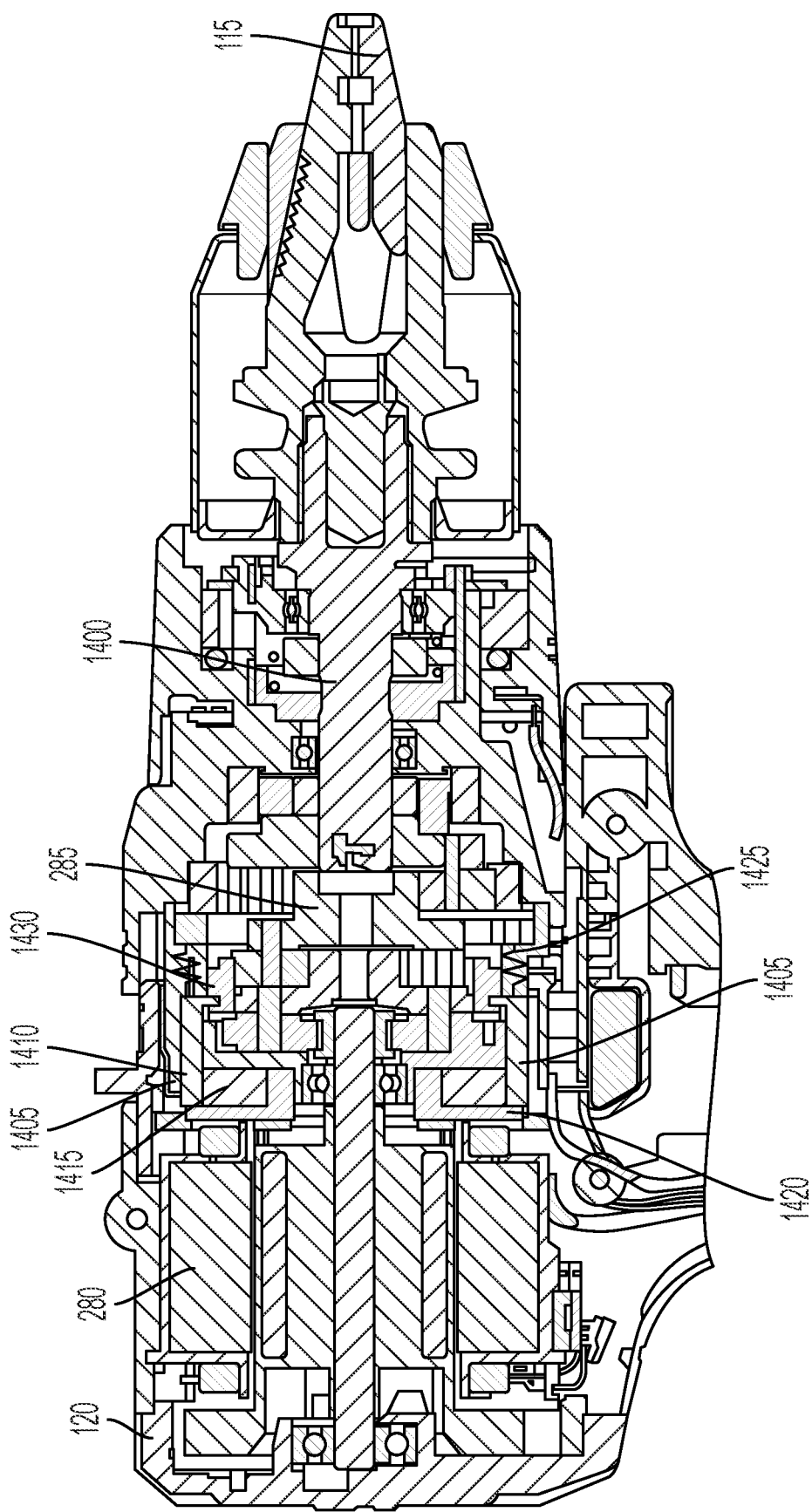
FIGS. 14A-14B illustrate cross-section of the power tool of FIG. 1 in accordance with embodiments described herein.
Figure 14B:
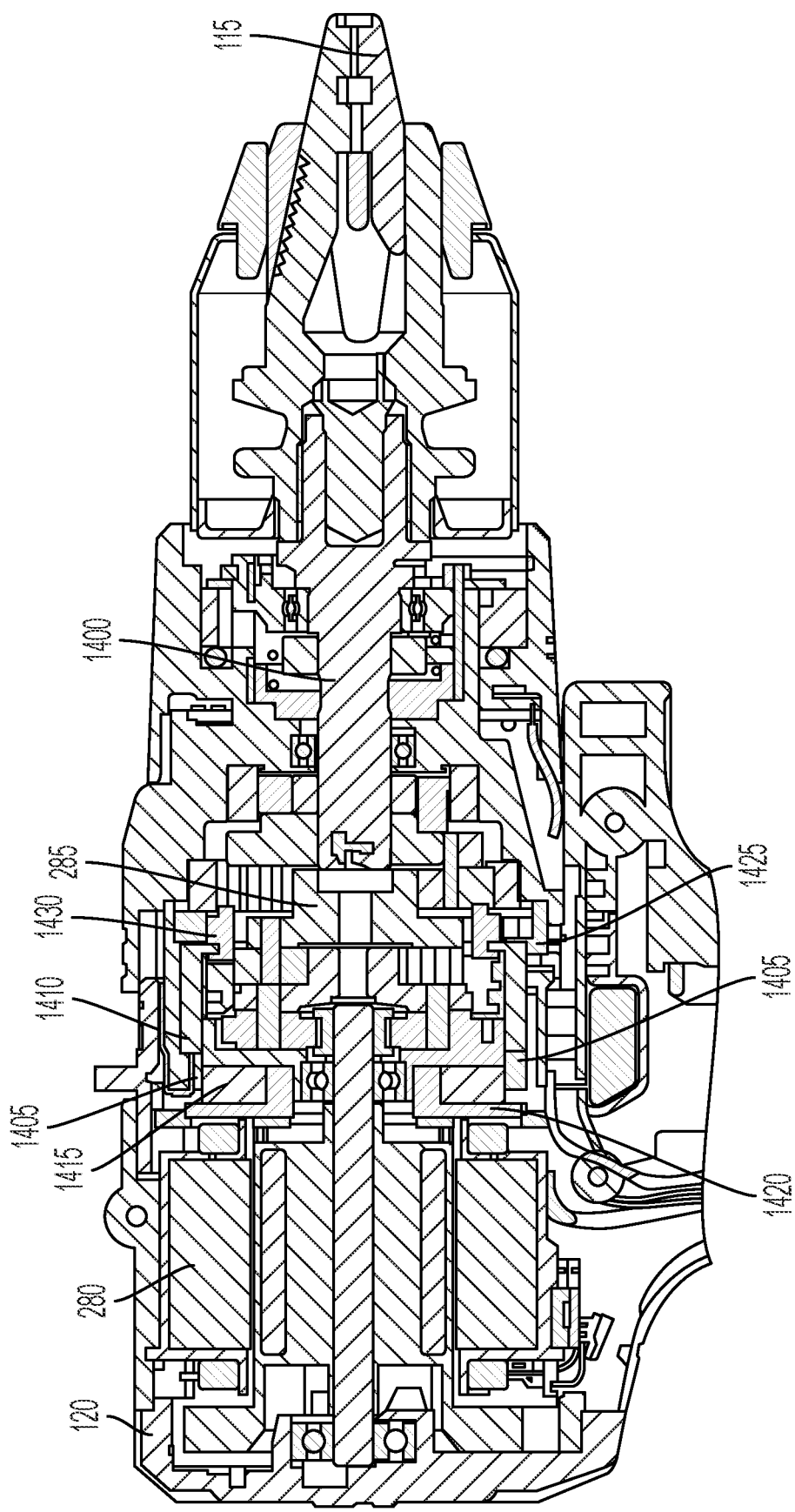

To select the gear ratio of the gearbox 285, the power tool 100 is provided with an electronically-selectable gear ratio. FIGS. 14A and 14B illustrate a cross-section of the motor housing 120 of the power tool 100, according to one embodiment. The motor housing 120 includes the motor 280 and the gearbox 285. As previously described, rotation of the motor 280 rotates gears within the gearbox 285. Rotation of the gearbox 285 rotates an output shaft 1400 connected to the driver 115.

Gear selector devices are provided adjacent to the gearbox 285 to actuate the gears within the gearbox 285, thereby setting a gear ratio. Specifically, in the example of FIGS. 14A and 14B, a gear selector device 1405 is provided substantially adjacent to the gearbox 285. In some embodiments, the gear selector device 1405 is a circular gear selector device that provides a pushing force and/or a pulling force around the entire circumference of the gearbox 285. While a single gear selector device 1405 is illustrated, in other embodiments, the power tool 100 may include two gear selector devices or three or more gear selector devices.

The gear selector device 1405 includes a ferromagnetic guide ring 1410 and a ferromagnetic housing 1420. The ferromagnetic housing 1420 contains an actuator coil 1415 (e.g., a solenoid). The ferromagnetic guide ring 1410 is connected to a spring 1425 configured to bias the ferromagnetic guide ring 1410. The ferromagnetic guide ring 1410 is connected to an engagement device 1430 that engages one or more gears in the gearbox 285. In this manner, movement of the ferromagnetic guide ring 1410 engages or disengages particular gears in the gearbox 285, setting the gear ratio.

Figure 15A:
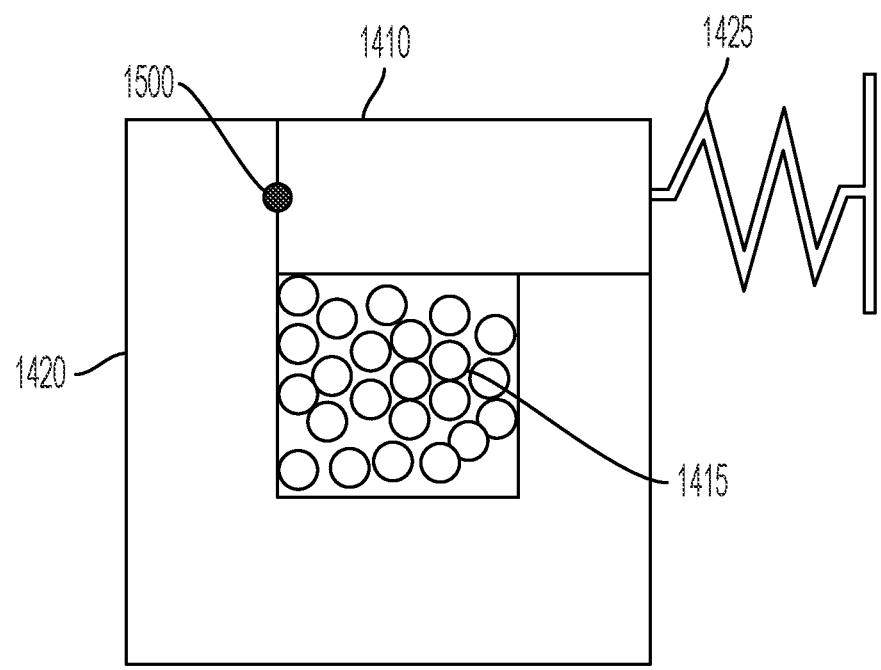
FIGS. 15A-15B illustrate a side view of a gear selection device in accordance with embodiments described herein.

The gear selector device 1405 may be in either an energized position (shown in FIG. 14A) or a de-energized position (shown in FIG. 14B). When in the energized position, the controller 200 provides a current to the actuator coil 1415, thereby generating a high magnetic flux and creating a reluctance force on the ferromagnetic guide ring 1410. The reluctance force overcomes the bias force provided by the spring 1425, and provides a force opposite the spring 1425 such that the ferromagnetic guide ring 1410 contacts the ferromagnetic housing 1420 at a contact point 1500 (shown in FIG. 15A).

Figure 15B:
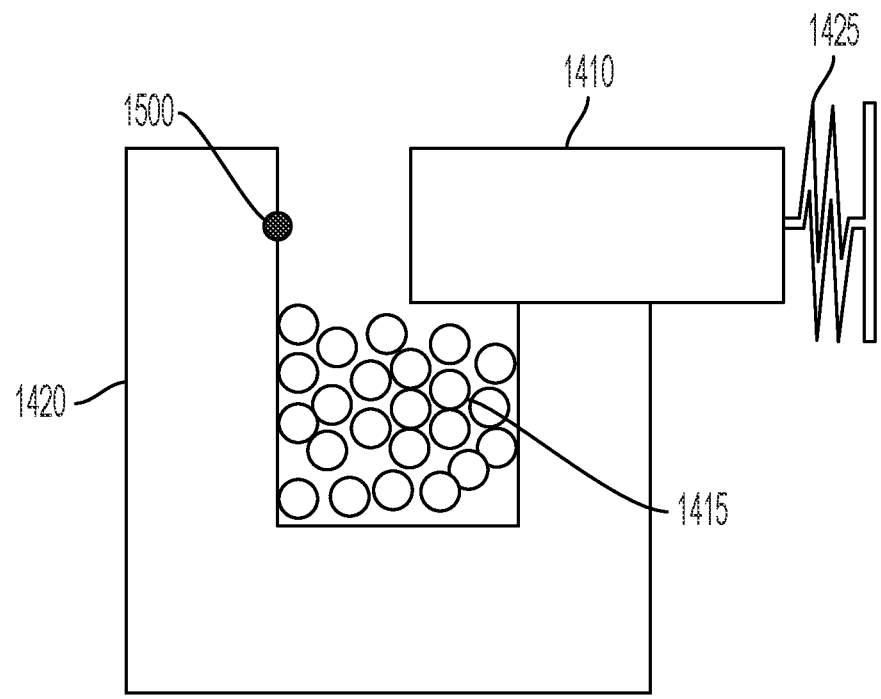

When in the de-energized position, no current is provided to the actuator coil 1415, and no magnetic flux is generated. Accordingly, the bias force of the spring 1425 pulls the ferromagnetic guide ring 1410 away from the ferromagnetic housing 1420 at the contact point 1500 (as shown in FIG. 15B). In some instances, the de-energized position is the default position of the gear selector device 1405, thereby selecting a default gear ratio. By providing current to or removing current from the gear selector device 1405, the controller 200 is able to switch gears in the gearbox 285.

In some embodiments, the controller 200 controls the gear ratio based on set operating modes of the power tool 100. For example, using the input device 140, a user of the power tool 100 may set a torque mode of the power tool 100 (e.g., a torque range, an output torque, a torque limit, etc.) and may set a speed mode of the power tool 100 (e.g., a maximum speed, an output speed, etc.). In some embodiments, the controller 200 calculates a torque limit and/or a maximum speed based on the input from the input device 140. The memory 225 may store a table indicating an amount of current to provide the actuator coil 1415 to achieve a particular gear ratio based on the operating modes of the power tool 100. Accordingly, while only two positions of the gear selector device 1405 are described above with respect to FIGS. 14A and 14B, in some instances, more than two positions of the gear selector device 1405 are implemented by varying the amount of current provided to the actuator coil 1415. For example, to move the ferromagnetic guide ring 1410 to the energized position, the controller 200 provides a first current value to the actuator coil 1415. To move the ferromagnetic guide ring 1410 to a position between the energized position, the controller 200 provides a second current value to the actuator coil 1415 that is less than the first current value.

Figure 16:
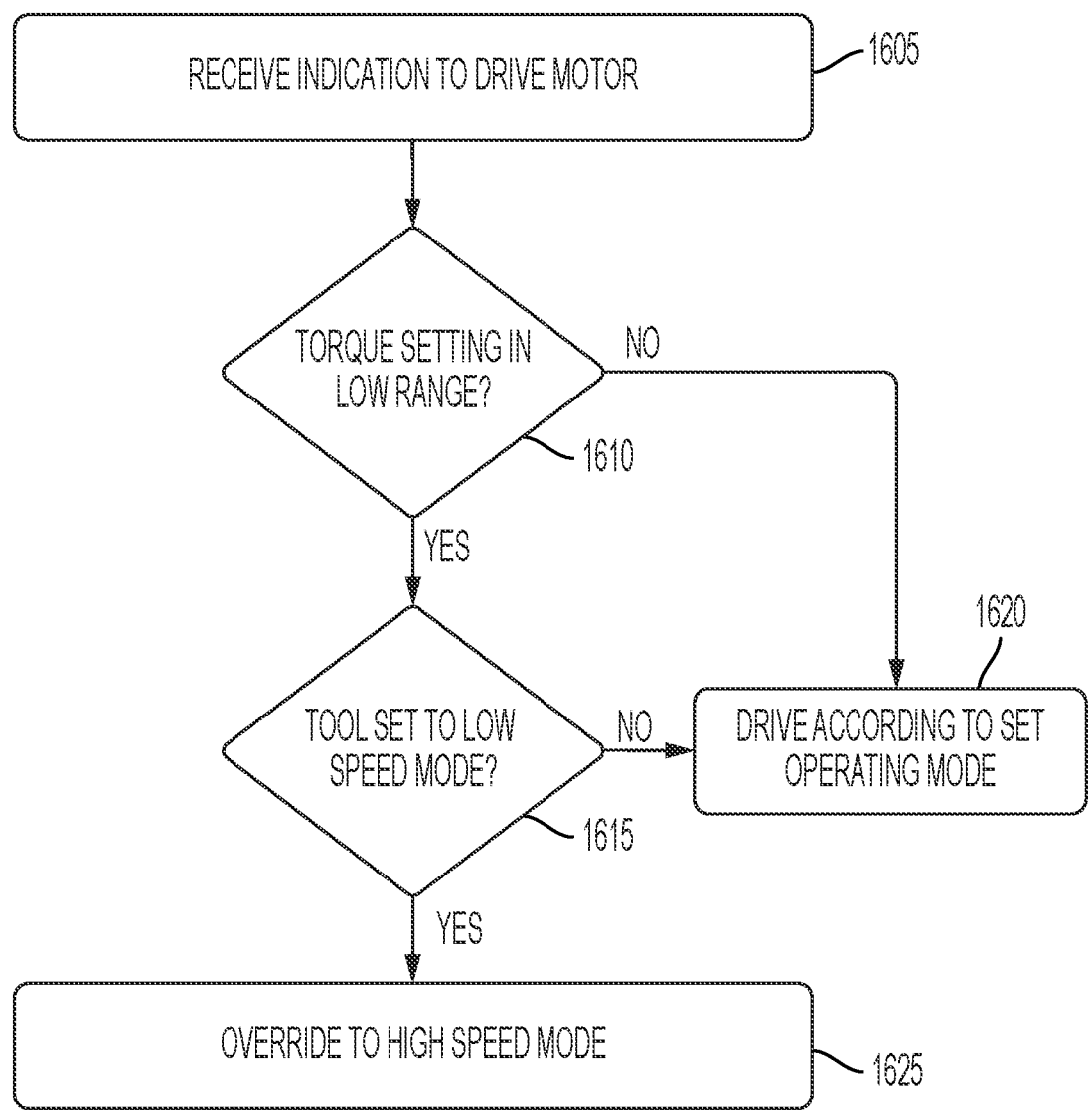
FIG. 16 illustrates a block diagram of another method performed by the controller of FIG. 2 in accordance with embodiments described herein.

FIG. 16 illustrates a method 1600 for selecting a gear ratio for the power tool 100. The method 1600 may be performed by the controller 200. At block 1605, the controller 200 receives an indication to drive the motor 280. For example, the controller 200 detects actuation of the trigger 125. At block 1610, the controller 200 determines whether a torque setting of the power tool 100 is within a low torque range (e.g., in a first or low torque operating mode). For example, a user of the power tool 100 provides a torque setting to the controller 200 using the input device 140. In some instances, the torque setting is determined based on the maximum allowed current for the power tool 100. In some embodiments, the torque setting is determined based on the set gear ratio. For example, a high torque mode may have a gear ratio of 50:1, and a low torque mode may have a gear ratio of 15:1. When the torque setting of the power tool 100 is not within a low torque range (e.g., is in a high torque mode), the method 1600 proceeds to block 1620 and the controller 200 drives the motor 280 according to the set operating mode. In some instances, to drive the motor 280 according to the set operating mode, the controller 200 controls the gear selector device 1405 to set the gear ratio according to the set operating mode.

When the torque setting of the power tool 100 is within a low torque range, the method 1600 proceeds to block 1615. At block 1615, the controller 200 determines whether the power tool 100 is set to a low speed mode. For example, a user of the power tool 100 provides a speed setting to the controller 200 using the input device 140. In some embodiments, the speed mode is determined based on the set gear ratio. For example, a high speed mode may have a gear ratio of 50:1, and a low speed mode may have a gear ratio of 15:1. When the power tool 100 is not set to a low speed mode (e.g., power tool 100 is set to a high speed mode), the method 1600 proceeds to block 1620 and the controller 200 drives the motor 280 according to the set operating mode. When the power tool 100 is in the low speed mode, the controller 200 proceeds to block 1625.

At block 1625, the controller 200 overrides the set operating mode of the power tool 100 and operates in a high speed mode. Accordingly, the controller 200 controls the gear selector device 1405 to set the gear ratio according to the high speed mode, regardless of the gear ratio selected by a user. In some embodiments, the controller 200 additionally limits the speed of the motor 280 to a speed limit of a low gear chuck included in the gearbox 285. By overriding the set operating mode while in low torque and low speed settings, the controller 200 avoids high torque overshoot and reduces the flywheel energy while providing a consistent torque output and maximizing the speed.

Noise Suppression

The audible noise range for humans generally falls between 20 Hz and 20,000 Hz. The PWM frequency used to control motors within power tools commonly fall between 6,000 Hz and 12,000 Hz. In embodiments described herein, the switches within the switching network 255 are controlled at approximately 8,000 Hz PWM frequencies. However, when the power tool 100 is being used at low torque and low speed, the noise of the PWM frequency is more apparent and may be irritating to a user of the power tool 100. Additionally, the motor 280 generates noise during operation due to torque ripple, normal force ripple, or a combination thereof.

Figure 17:
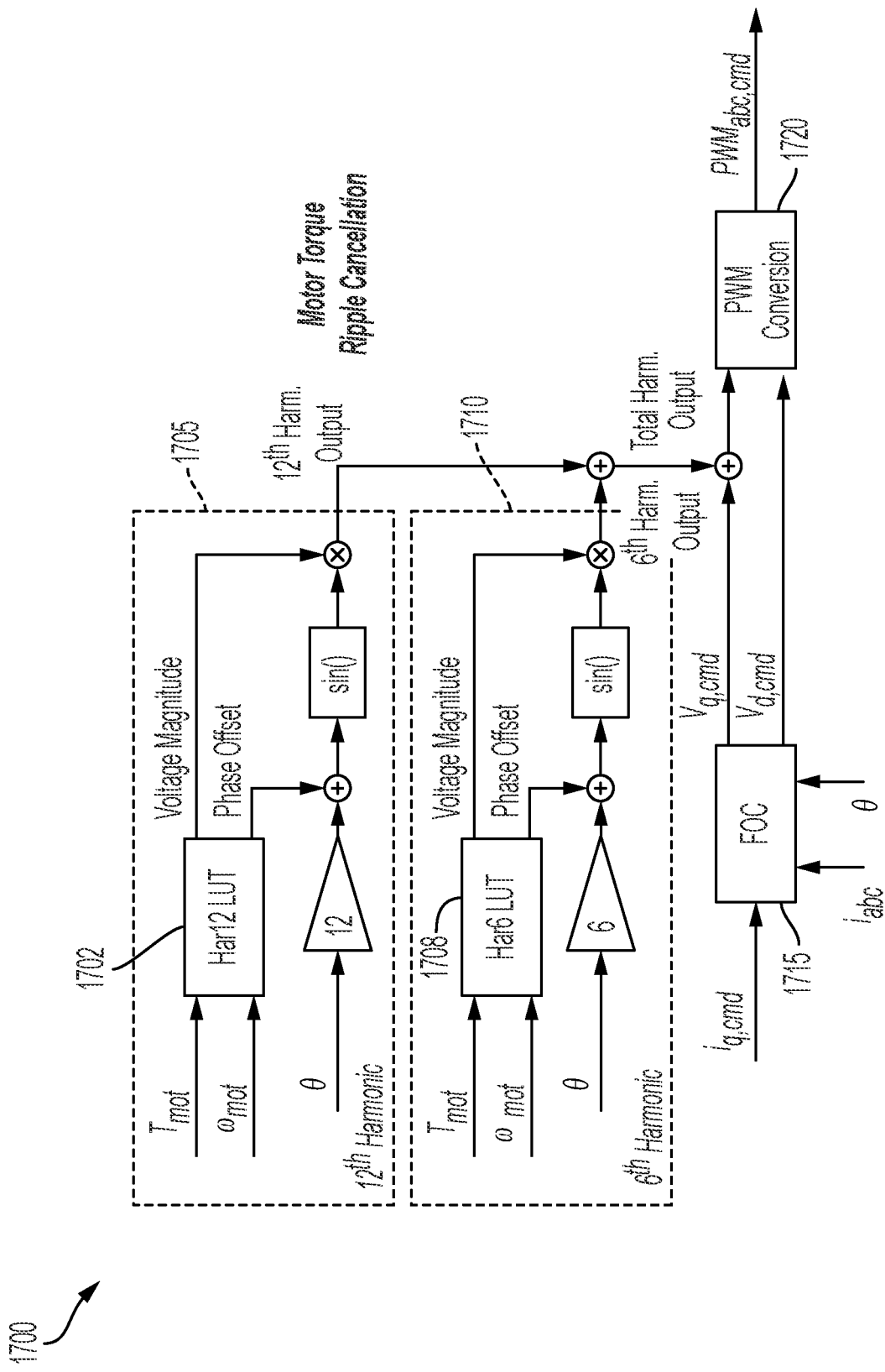
FIG. 17 illustrates an open-loop control diagram performed by the controller of FIG. 2 in accordance with embodiments described herein.

To offset and otherwise reduce noise, the controller 200 may generate noise targeting torque ripple cancellation, may adjust the PWM frequency of the switching network 255, or a combination thereof. For example, in some embodiments, the controller 200 injects voltage frequencies in the audible range that cancel torque ripple noise by actively tracking the position of the motor 280 (e.g., using a position signal from the position sensor included in the secondary sensors 274). FIG. 17 provides an example block diagram 1700 of an open-loop control for injecting voltage frequencies based on the position of the motor 280. At logic block 1705, the torque of the motor 280 ($T_{mot}$) and the angular velocity of the motor 280 ($\omega_{mot}$) are provided to a look-up table 1702 (e.g., a twelfth-harmonic look-up table). The look-up table 1702 outputs a voltage magnitude and phase offset based on the torque of the motor 280 and the angular velocity of the motor 280. The phase offset is summed with the electrical rotor position ($\Theta$). The electrical rotor position ($\Theta$) is multiplied by 12 to obtain the torque ripple associated with the twelfth harmonic of the fundamental frequency of the motor 280. A sine function is applied to the result of the summation. The output of the sine function is then multiplied with the voltage magnitude from the look-up table 1702 to generate a harmonic output (e.g., the twelfth harmonic output).

At block 1710, a similar operation is performed, for example, for the sixth harmonic. For example, the torque of the motor 280 ($T_{mot}$) and the angular velocity of the motor 280 ($\omega_{mot}$) are provided to a look-up table 1708 (e.g., a sixth harmonic lookup table). The look-up table 1708 outputs a voltage magnitude and phase offset based on the torque of the motor 280 and the angular velocity of the motor 280. The phase offset is summed with the electrical rotor position ($\Theta$) multiplied by 6 to obtain the torque ripple associated with the sixth harmonic of the fundamental frequency of the motor 280. A sine function is applied to the result of the summation. The output of the sine function is then multiplied with the voltage magnitude from the look-up table 1708 to generate a harmonic output (e.g., the sixth harmonic output). While FIG. 17 illustrates block 1705 and block 1710 generating a twelfth harmonic output and a sixth harmonic output, respectively, additional harmonic outputs may also be generated and summed using additional logic blocks. Additionally, other harmonic outputs may be generated in replace of the twelfth harmonic output and the sixth harmonic output based on the geometry of the motor 280 (for example, based on the number of stator teeth, a back-emf type, a number of pole pairs, etc.).

In some embodiments, a field-oriented control module 1715 receives a current command ($i_{q,cmd}$), the current of each motor phase ($i_{abc}$), and an angle or position of the motor ($\Theta$). The field-oriented control module 1715 outputs voltage commands (e.g., voltage command signals) $V_{q,cmd}$ and $V_{d,cmd}$, or commands indicative of a voltage requested by a regulator of the field-oriented control module 1715. The $V_{q,cmd}$ is summed with the sum of the harmonic outputs of logic blocks 1705 and 1710 to generate a total harmonic output. The total harmonic output and the $V_{d,cmd}$ are provided to PWM conversion module 1720, which outputs the PWM command $PWM_{abc,cmd}$ used to drive the switching network 255. The field-oriented control module 1715 maintains current control over d- and q-currents by manipulating the $V_{q,cmd}$ and $V_{d,cmd}$ commands. In some instances, $V_{q,cmd}$ and $V_{d,cmd}$ are converted to PWM commands by comparing the size of the $V_{q,cmd}$ and $V_{d,cmd}$ commands to the voltage of the battery pack 150.

The noise injection provided by the logic blocks 1705 and 1710 are high frequency electromagnetic fields that introduces torque ripple equal and opposite in magnitude to the torque ripple naturally present with the motor 280 (or a natural noise of the motor 280), causing an approximately net-zero amount of torque ripple and reducing torque ripple as a source of acoustic noise. By using the position of the motor 280 when generating the noise, the injected frequency is synchronized with the actual torque ripple of the motor 280.

FIG. 17 provides a particular example of injecting noise to reduce torque ripple using, for example, the sixth and twelfth harmonics of the torque ripple. Other implementations may use different harmonics than the sixth and twelfth harmonics or frequencies in the audible range to reduce acoustic noise from the motor 280.

Figure 18:
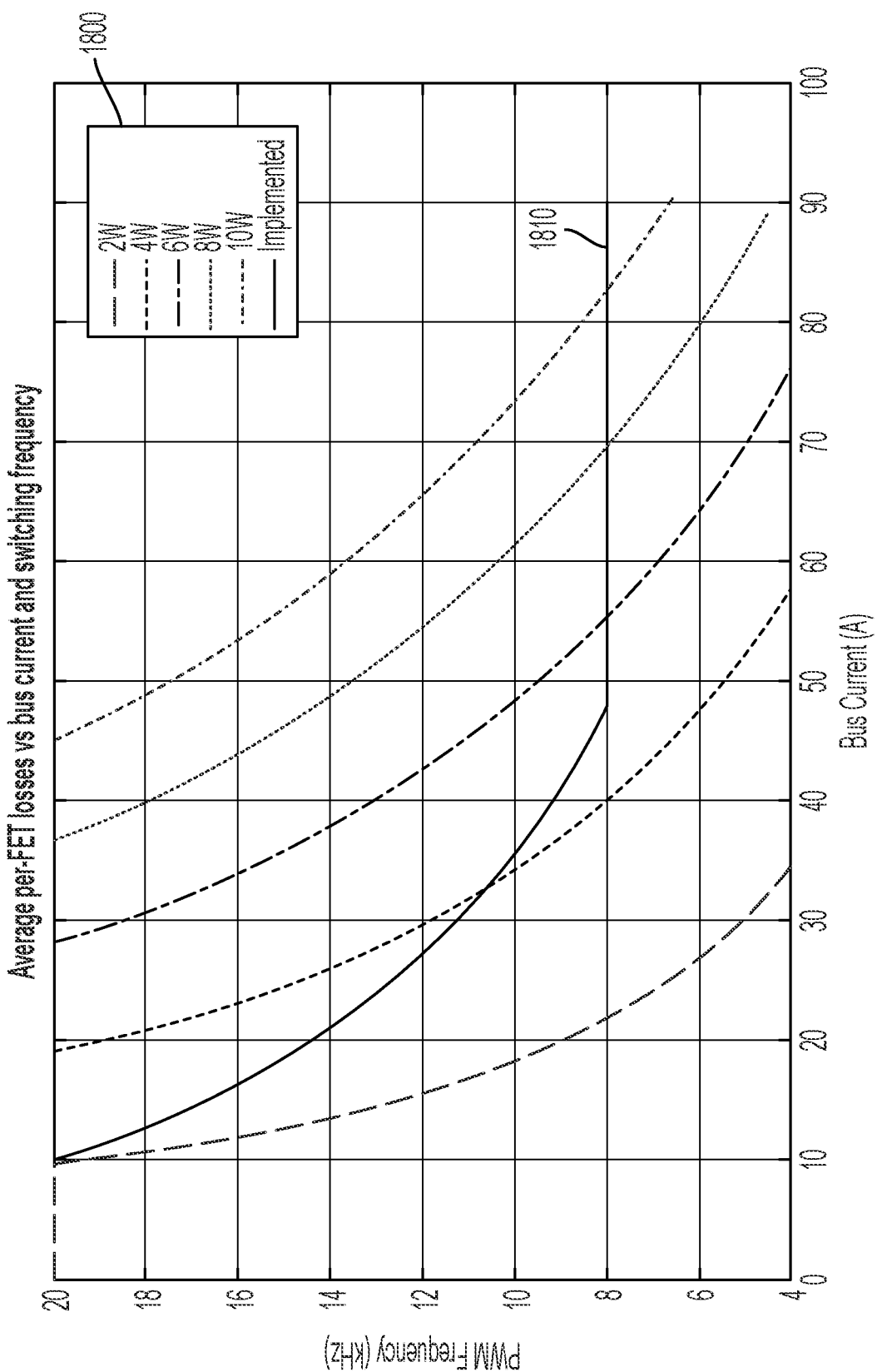
FIG. 18 illustrates a graph of average per-FET losses versus bus current and switching frequency values in accordance with embodiments described herein.
Figure 19:
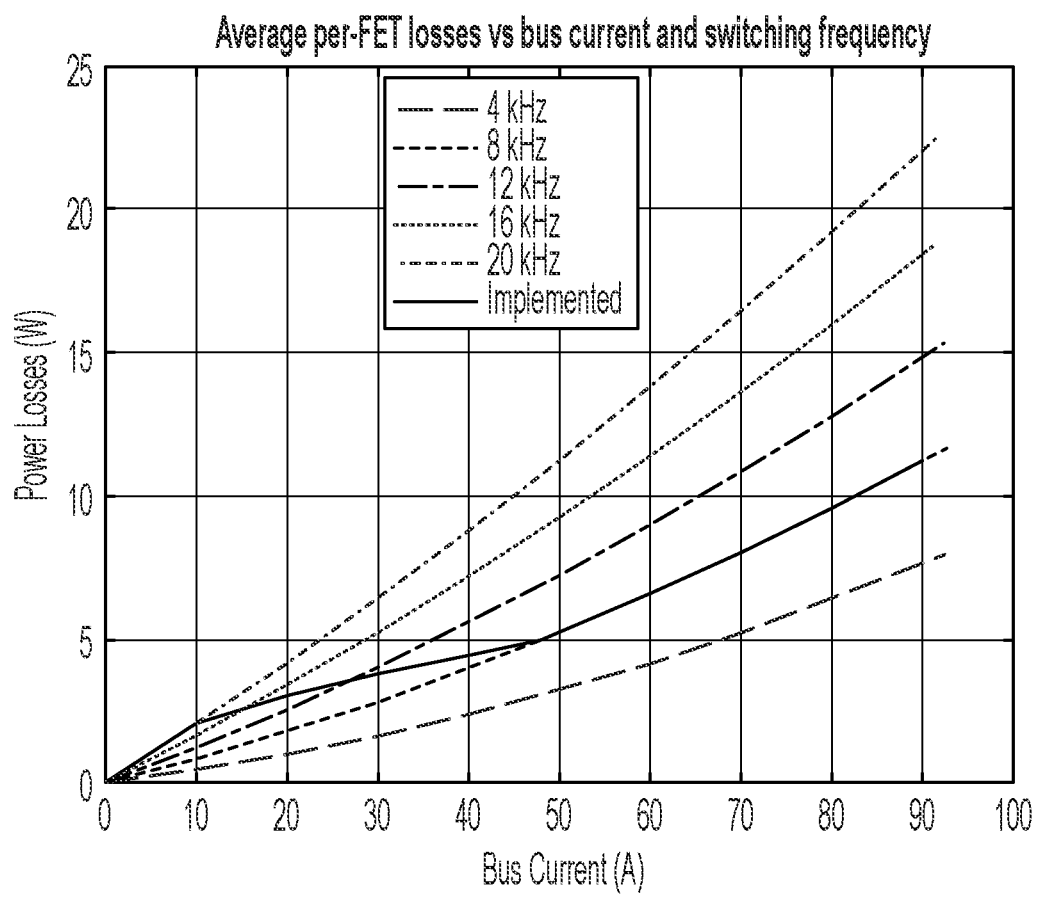
FIG. 19 illustrates another graph of average per-FET losses versus bus current and switching frequency values in accordance with embodiments described herein.

In some embodiments, to account for the noise of the PWM frequency used to control the switching network 255, the controller 200 may dynamically adjust the PWM frequency (e.g., the PWM command provided by the bus current controller 320) based on feedback data associated with the operation of the power tool 100. In this manner, the controller 200 shifts the PWM frequency out of the audible range when switching losses are lower. For example, FIG. 18 provides example average per-FET power losses compared to the bus current of the motor 280 and the switching frequency of the switching network 255. FIG. 19, similarly, provides the switching frequency of the switching network 255 compared to the bus current of the motor 280 and the per-FET power losses. As shown in FIGS. 18 and 19, a greater bus current for a given PWM frequency is correlated with a greater average per-FET power loss. Accordingly, in some instances, the controller 200 uses the bus current of the motor 280 (e.g., as provided by the current sensor 270) to adjust the PWM frequency.

Primarily with reference to FIG. 18, a plurality of functions 1800 provide the average per-FET power losses for given PWM frequencies and bus current values. The plurality of functions 1800 include a control function 1810, which, in some instances, is a function implemented by the controller 200 to reduce noise. For example, at low power operations (such as operations having a bus current value less than approximately 48 A), the controller 200 raises the PWM frequency as a function of the bus current value. When the bus current has a value of approximately 40 A, the controller 200 sets the PWM frequency to approximately 9.2 kHz. At approximately 30 A, the controller 200 sets the PWM frequency to approximately 11 kHz. At approximately 20 A, the controller 200 sets the PWM frequency to approximately 14.5 kHz. At approximately 10 A, the controller 200 sets the PWM frequency to approximately 20 kHz. Accordingly, the controller 200 increases the PWM frequency as the power tool 100 is operated in low power conditions.

During high power operations (such as operations having a bus current value greater than approximately 48 A), the controller 200 maintains the PWM frequency at approximately 8 kHz. Should the operation of the power tool 100 transition from a low power operation to a high power operation, the control function 1810 provides for a smooth transition from an inaudible PWM frequency to an audible PWM frequency, providing a perception of the load of the power tool 100 increasing. The feedback data used to control PWM frequency is naturally noisy and gives a natural dither to the PWM frequency which scatters the noise to make it less piercing.

Figure 20:
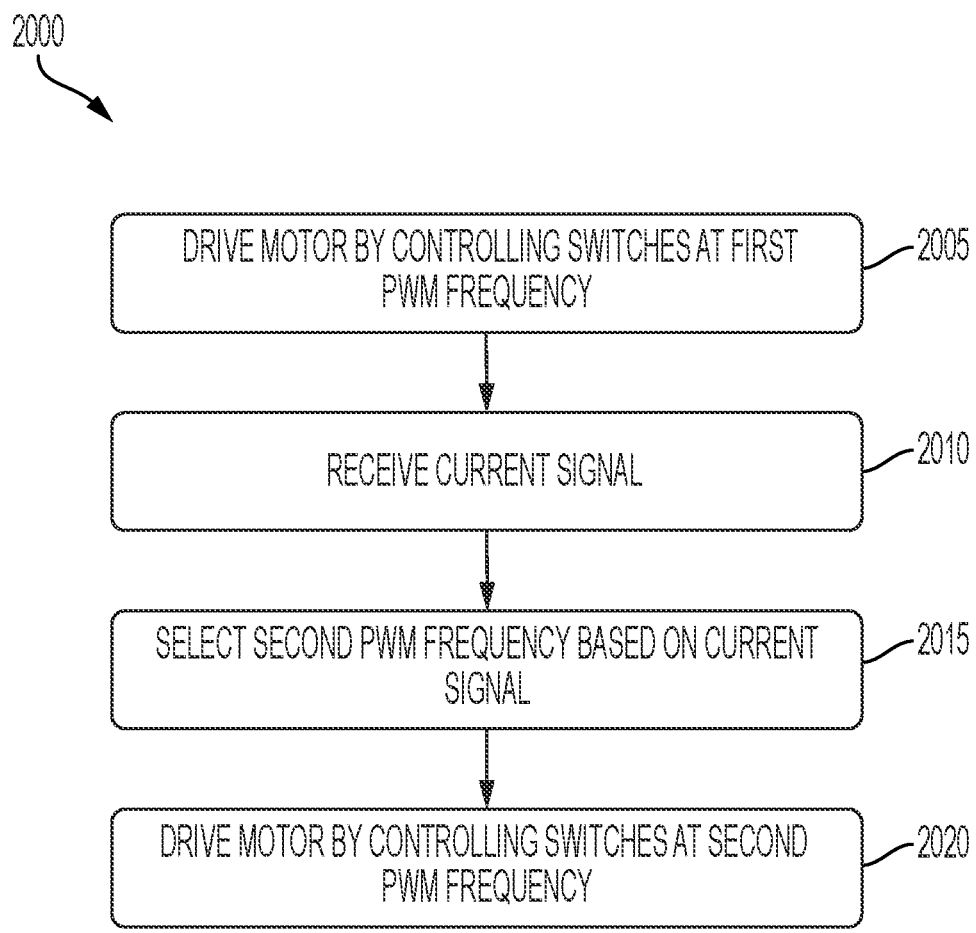
FIG. 20 illustrates a block diagram of another method performed by the controller of FIG. 2 in accordance with embodiments described herein.

FIG. 20 illustrates a method 2000 for adjusting the PWM frequency. The method 2000 may be performed by the controller 200. At block 2005, the controller 200 drives the motor 280 by controlling the switching network 255 at a first PWM frequency. For example, while performing a low power operation, the controller 200 controls the switching network 255 at 16 kHz. At block 2010, the controller 200 receives a current signal indicative of the bus current of the motor 280. For example, the current sensor 270 provides the current signal to the controller 200.

At block 2015, the controller 200 selects a second PWM frequency based on the current signal. For example, in some implementations, the memory 225 stores the control function 1810 as a table mapping bus current values to PWM frequency values. The controller 200 compares the bus current value to the table to determine the second PWM frequency value. At block 2020, the controller 200 drives the motor 280 by controlling the switching network 255 at the second PWM frequency. In some embodiments, the controller 200 continues to receive current signals and adjust the PWM frequency continuously during operation of the motor 280. In some embodiment, the PWM frequency is increased for low torque and/or low speed operation. In other embodiments, the PWM frequency is high by default and reduced as output power increases.

In some instances, the controller 200 dynamically adjusts the PWM frequency based on the temperature of the switching network 255 (e.g., as indicated by the temperature sensor 272). For example, as the measured temperature of the switching network 255 increases, the controller 200 reduces the PWM frequency, avoiding an overtemperature event of the switching network 255. In some embodiments, the controller 200 adjusts the PWM frequency based on both the bus current and the temperature of the switching network 255. For example, the controller 200 may lower the PWM frequency determined based on the bus current (at block 2015) when the temperature of the switching network 255 increases above a temperature threshold. In some embodiments, motor speed is additionally or alternatively used to control the PWM frequency.

Representative Features

Representative features are set out in the following clauses, which stand alone or may be combined, in any combination, with one or more features disclosed in the text and/or drawings of the specification.

1. A power tool including an electronic clutch, the power tool comprising:
    a motor;
    a trigger; and
    a controller connected to the trigger and the motor, the controller configured to:
        provide, in response to actuation of the trigger, power to the motor,
        determine a speed of the motor,
        activate the electronic clutch, in response to determining that the speed of the motor has dropped by a speed drop threshold within a first period of time, to electronically brake the motor for a second period of time, and
        provide, in response to the second period of time having passed, power to the motor.

2. The power tool of clause 1, wherein the controller is further configured to:
    determine, based on the speed of the motor and a speed command signal, a torque value at which to drive the motor;
    compare the torque value to a torque-current look-up table;
    determine, based on the comparison, an electric current value to provide to the motor; and
    provide the electric current value to the motor to drive the motor.

3. The power tool of clause 2, further comprising:
    a current sensor configured to provide current signals indicative of a current of the motor,
    wherein the controller is further configured to:
        receive, from the current sensor, the current signals indicative of the current of the motor,
        determine a pulse width modulation (PWM) duty cycle ratio based on the current of the motor and the electric current value, and drive the motor according to the PWM duty cycle ratio.

4. The power tool of any preceding clause, further comprising:
a torque sensor configured to provide torque signals indicative of the torque of the motor,
wherein the controller is further configured to:
receive, from the torque sensor, the torque signals indicative of the torque of the motor,
determine a pulse width modulation (PWM) duty cycle ratio based on the torque of the motor and a desired torque, and
drive the motor according to the PWM duty cycle ratio.

5. The power tool of any preceding clause, wherein the controller is further configured to:
control, in response to actuation of the trigger, the motor according to a first operating mode for a third period of time.

6. The power tool of clause 5, wherein the controller is further configured to:
limit, in response to the third period of time having passed, a motor current provided to the motor for a fourth period of time.

7. The power tool of clause 6, wherein the controller is further configured to:
control, in response to the fourth period of time having passed, the motor according to the first operating mode.

8. The power tool of any preceding clause, further comprising:
an input device configured to set a desired torque value, and wherein the controller is further configured to:
determine a torque limit based on the desired torque value, and
control the motor based in part on the torque limit.

9. The power tool of clause 8, wherein the input device is a torque ring.

10. The power tool of any preceding clause, wherein the controller is configured to:
detect a high load state of the motor based on the speed of the motor; and
limit, in response to the high load state of the motor, a torque value at which to drive the motor.

11. A method for operating a power tool including an electronic clutch, the method comprising:
providing, in response to actuation of a trigger, power to a motor;
determining a speed of the motor;
determining whether the speed of the motor has dropped by a speed drop threshold within a first period of time;
activating the electronic clutch, in response to determining that the speed of the motor has dropped by the speed drop threshold within the first period of time, to electronically brake the motor for a second period of time; and
providing, in response to the second period of time having passed, power to the motor.

12. The method of clause 11, further comprising:
determining, based on the speed of the motor and a speed command, a torque value at which to drive the motor;
comparing the torque value to a torque-current look-up table;
determining, based on the comparison, an electric current value to provide to the motor; and
providing the electric current value to the motor to drive the motor.

13. The method of clause 12, further comprising:
receiving, from a current sensor, current signals indicative of a current of the motor;

determining a pulse width modulation (PWM) duty cycle ratio based on the current of the motor and the electric current value; and
driving the motor according to the PWM duty cycle ratio.

14. The method of any of clauses 11-12, further comprising:
receiving, from a torque sensor, the torque signals indicative of a torque of the motor,
determining a pulse width modulation (PWM) duty cycle ratio based on the torque of the motor and a desired torque, and
driving the motor according to the PWM duty cycle ratio 15. The method of any of clauses 11-14, further comprising:
controlling, in response to actuation of the trigger, the motor according to a first operating mode for a third period of time; and
limit, in response to the third period of time having passed, a motor current provided to the motor for a fourth period of time.

16. The method of any of clauses 11-15, further comprising:
determining a torque limit based on a desired torque value; and
controlling the motor based in part on the torque limit.

17. The method of any of clauses 11-16, further comprising:
detecting a high load state of the motor based on the speed of the motor; and
limiting, in response to the high load state of the motor, a torque value at which to drive the motor.

18. The method of any of clauses 11-17, further comprising:
receiving, from a temperature sensor, temperature signals indicative of a temperature of a mechanism driven by the motor;
determining, based on the temperature signals, a torque value at which to drive the motor; and driving the motor according to the torque value.

19. A power tool including an electronic clutch, the power tool comprising:
a motor; and
a controller connected to the motor, the controller configured to:
drive the motor according to a first speed setting,
determine a speed of the motor,
determine, while in the first speed setting, whether the speed of the motor is greater than or equal to a first speed threshold,
drive, in response to the speed of the motor being greater than or equal to the first speed threshold, the motor according to a second speed setting,
determine, while in the second speed setting, whether the speed of the motor is less than a second speed threshold, and
limit, in response to determining that the speed of the motor is below the second speed threshold, a motor current for a clutch timeout period.

20. The power tool of clause 19, wherein the controller is further configured to:
drive, in response to the clutch timeout period having passed, the motor according to the first speed setting.

21. The power tool of clause 19 or clause 20, wherein the first speed threshold is equal to the second speed threshold.

22. The power tool of any of clauses 19-21, further comprising an input device configured to set a desired torque value, and wherein the controller is further configured to:

calculate a torque limit based on the desired torque value, and
control the motor based in part on the torque limit.
23. A power tool comprising:
a motor;
a geartrain coupled to the motor;
a gear selector device configured to set a gear ratio of the geartrain;
a trigger; and
a controller connected to the motor, the trigger, and the gear selector device, the controller configured to:
receive, from the trigger, an indication to drive the motor,
determine a torque setting of the power tool,
determine a speed setting of the power tool, and
control, based on the torque setting and the speed setting, the gear selector device to set the gear ratio of the geartrain.
24. The power tool of clause 23, wherein the gear selector device includes:
a solenoid;
a ferromagnetic guide ring; and
a spring coupled to the ferromagnetic guide ring.
25. The power tool of clause 24, wherein the controller is further configured to control the gear selector device by providing a current to the solenoid to generate a magnetic flux, and wherein the magnetic flux provides a force on the ferromagnetic guide ring greater than and opposite to a force provided by the spring on the ferromagnetic guide ring.
26. The power tool of any of clauses 23-25, wherein the controller is further configured to:
determine whether the torque setting of the power tool is within a low torque range; and
control, in response to the torque setting not being within the low torque range, the gear selector device to set the gear ratio to a default gear ratio.
27. The power tool of clause 26, wherein the controller is further configured to:
determine whether the speed setting of the power tool is a low speed mode; and
control, in response to the speed setting of the power tool not being the low speed mode, the gear selector device to set the gear ratio to the default gear ratio.
28. The power tool of clause 27, wherein the controller is further configured to:
control, in response to the torque setting of the power tool being within the low torque range and in response to the speed setting of the power tool being the low speed mode, the gear selector device to set the gear ratio to a second gear ratio different from the default gear ratio.
29. A method for operating a power tool, the method comprising:
receiving, from a trigger, an indication to drive a motor;
determining a torque setting of the power tool;
determining a speed setting of the power tool; and
controlling, based on the torque setting and the speed setting, a gear selector device to set a gear ratio of a geartrain coupled to the motor.
30. The method of clause 29, further comprising:
controlling the gear selector device by providing a current to a solenoid to generate a magnetic flux.
31. The method of any of clauses 29-30, further comprising:
determining whether the torque setting of the power tool is within a low torque range; and
controlling, in response to the torque setting not being within the low torque range, the gear selector device to set the gear ratio to a default gear ratio.
32. The method of clause 31, further comprising:
determining whether the speed setting of the power tool is a low speed mode; and
controlling, in response to the speed setting of the power tool not being the low speed mode, the gear selector device to set the gear ratio to the default gear ratio.
33. The method of clause 32, further comprising:
controlling, in response to the torque setting of the power tool being within the low torque range and in response to the speed setting of the power tool being the low speed mode, the gear selector device to set the gear ratio to a second gear ratio different from the default gear ratio.
34. A power tool comprising:
a motor;
a battery pack;
a switching network connected between the motor and the battery pack and configured to provide power to the motor, wherein the switching network includes a plurality of switches;
a current sensor configured to sense a current of the motor;
a trigger; and
a controller connected to the switching network, the trigger, and the current sensor, the controller configured to:
drive, in response to actuation of the trigger, the motor by controlling the plurality of switches at a first pulse width modulation (PWM) frequency,
receive, from the current sensor, a current signal indicative of the current of the motor,
select a second PWM frequency based on the current signal, and
drive the motor by controlling the plurality of switches at the second PWM frequency.
35. The power tool of clause 34, further comprising:
a position sensor configured to sense a position of the motor;
wherein the controller is further configured to:
receive, from the position sensor, a position signal indicative of the position of the motor,
generate a noise signal based on the position of the motor, and
inject the noise signal into a voltage command signal, the noise signal being opposite in magnitude to a natural noise generated by the motor.
36. The power tool of clause 35, wherein, to generate the noise signal, the controller is further configured to:
compare a torque of the motor and an angular velocity of the motor to a first look-up table to generate a first voltage magnitude and a first phase offset;
sum the first phase offset with a first harmonic of a frequency of a torque ripple generated by the motor to generate a first harmonic summation; and
sum the first voltage magnitude and the first harmonic summation.
37. The power tool of clause 36, wherein, to generate the noise signal, the controller is further configured to:
compare the torque of the motor and the angular velocity of the motor to a second look-up table to generate a second voltage magnitude and a second phase offset;
sum the second phase offset with a second harmonic of the frequency of the torque ripple generated by the motor to generate a second harmonic summation; and sum the second voltage magnitude and the second harmonic summation.

38. The power tool of any of clauses 34-37, wherein the controller is further configured to select the second PWM signal by:
comparing the current signal to a table stored in a memory.

39. The power tool of any of clauses 34-38, further comprising:
a temperature sensor configured to sense a temperature of the plurality of switches,
wherein the controller is further configured to:
receive, from the temperature sensor, a temperature signal indicative of the temperature of the plurality of switches,
adjust the second PWM frequency based on the temperature signal to generate a third PWM frequency, and
drive the motor by controlling the plurality of switches at the third PWM frequency.

40. A method for operating a power tool, the method comprising:
driving, in response to actuation of a trigger, a motor by controlling a plurality of switches at a first pulse width modulation (PWM) frequency, wherein the plurality of switches are connected between the motor and a battery pack and configured to provide power to the motor;
receiving, from a current sensor, a current signal indicative of a current of the motor;
selecting a second PWM frequency based on the current signal; and
driving the motor by controlling the plurality of switches at the second PWM frequency.

41. The method of clause 40, further comprising:
receiving, from a position sensor, a position signal indicative of a position of the motor;
generating a noise signal based on the position of the motor; and
injecting the noise signal into a voltage command signal, the noise signal being opposite in magnitude to a natural noise generated by the motor.

42. The method of clause 41, wherein generating the noise signal further comprises:
comparing a torque of the motor and an angular velocity of the motor to a first look-up table to generate a first voltage magnitude and a first phase offset;
summing the first phase offset with a first harmonic of a frequency of a torque ripple generated by the motor to generate a first harmonic summation; and
summing the first voltage magnitude and the first harmonic summation.

43. The method of clause 42, wherein generating the noise signal further comprises:
comparing the torque of the motor and the angular velocity of the motor to a second look-up table to generate a second voltage magnitude and a second phase offset;
summing the second phase offset with a second harmonic of the frequency of the torque ripple generated by the motor to generate a second harmonic summation; and
summing the second voltage magnitude and the second harmonic summation.

44. The method of any of clauses 40-43, wherein selecting the second PWM frequency includes comparing the current signal to a table.

45. The method of any of clauses 40-44, further comprising:
receiving, from a temperature sensor, a temperature signal indicative of a temperature of the plurality of switches;
adjusting the second PWM frequency based on the temperature signal to generate a third PWM frequency; and
driving the motor by controlling the plurality of switches at the third PWM frequency.

Thus, embodiments provided herein describe, among other things, systems and methods for electronically limiting the torque of a power tool. Various features and advantages are set forth in the following claims.

What is claimed is:

1. A power tool including an electronic clutch, the power tool comprising:
a motor;
a trigger; and
a controller connected to the trigger and the motor, the controller configured to:
provide, in response to actuation of the trigger, power to the motor,
determine a speed of the motor,
activate the electronic clutch, in response to determining that the speed of the motor has dropped by a speed drop threshold within a first period of time, to electronically brake the motor for a second period of time, and
provide, in response to the second period of time having passed, power to the motor.

2. The power tool of claim 1, wherein the controller is further configured to:
determine, based on the speed of the motor and a speed command signal, a torque value at which to drive the motor;
compare the torque value to a torque-current look-up table;
determine, based on the comparison, an electric current value to provide to the motor; and
provide the electric current value to the motor to drive the motor.

3. The power tool of claim 2, further comprising:
a current sensor configured to provide current signals indicative of a current of the motor,
wherein the controller is further configured to:
receive, from the current sensor, the current signals indicative of the current of the motor,
determine a pulse width modulation (PWM) duty cycle ratio based on the current of the motor and the electric current value, and
drive the motor according to the PWM duty cycle ratio.

4. The power tool of claim 1, further comprising:
a torque sensor configured to provide torque signals indicative of the torque of the motor,
wherein the controller is further configured to:
receive, from the torque sensor, the torque signals indicative of the torque of the motor,
determine a pulse width modulation (PWM) duty cycle ratio based on the torque of the motor and a desired torque, and
drive the motor according to the PWM duty cycle ratio.

5. The power tool of claim 1, wherein the controller is further configured to:
control, in response to actuation of the trigger, the motor according to a first operating mode for a third period of time.

6. The power tool of claim 5, wherein the controller is further configured to:

limit, in response to the third period of time having passed, a motor current provided to the motor for a fourth period of time.

7. The power tool of claim 6, wherein the controller is further configured to:
control, in response to the fourth period of time having passed, the motor according to the first operating mode.

8. The power tool of claim 1, further comprising:
an input device configured to set a desired torque value, and wherein the controller is further configured to:
determine a torque limit based on the desired torque value, and
control the motor based in part on the torque limit.

9. The power tool of claim 1, wherein the controller is configured to:
detect a high load state of the motor based on the speed of the motor; and
limit, in response to the high load state of the motor, a torque value at which to drive the motor.

10. A method for operating a power tool including an electronic clutch, the method comprising:
providing, in response to actuation of a trigger, power to a motor;
determining a speed of the motor;
determining whether the speed of the motor has dropped by a speed drop threshold within a first period of time;
activating the electronic clutch, in response to determining that the speed of the motor has dropped by the speed drop threshold within the first period of time, to electronically brake the motor for a second period of time; and
providing, in response to the second period of time having passed, power to the motor.

11. The method of claim 10, further comprising:
determining, based on the speed of the motor and a speed command, a torque value at which to drive the motor;
comparing the torque value to a torque-current look-up table;
determining, based on the comparison, an electric current value to provide to the motor; and
providing the electric current value to the motor to drive the motor.

12. The method of claim 11, further comprising:
receiving, from a current sensor, current signals indicative of a current of the motor;
determining a pulse width modulation (PWM) duty cycle ratio based on the current of the motor and the electric current value; and
driving the motor according to the PWM duty cycle ratio.

13. The method of claim 10, further comprising:
receiving, from a torque sensor, the torque signals indicative of a torque of the motor,
determining a pulse width modulation (PWM) duty cycle ratio based on the torque of the motor and a desired torque, and
driving the motor according to the PWM duty cycle ratio.

14. The method of claim 10, further comprising:
determining a torque limit based on a desired torque value; and
controlling the motor based in part on the torque limit.

15. The method of claim 10, further comprising:
detecting a high load state of the motor based on the speed of the motor; and
limiting, in response to the high load state of the motor, a torque value at which to drive the motor.

16. The method of claim 10, further comprising:
receiving, from a temperature sensor, temperature signals indicative of a temperature of a mechanism driven by the motor;
determining, based on the temperature signals, a torque value at which to drive the motor; and
driving the motor according to the torque value.

17. A power tool including an electronic clutch, the power tool comprising:
a motor; and
a controller connected to the motor, the controller configured to:
drive the motor according to a first speed setting,
determine a speed of the motor,
determine, while in the first speed setting, whether the speed of the motor is greater than or equal to a first speed threshold,
drive, in response to the speed of the motor being greater than or equal to the first speed threshold, the motor according to a second speed setting,
determine, while in the second speed setting, whether the speed of the motor is less than a second speed threshold, and
limit, in response to determining that the speed of the motor is below the second speed threshold, a motor current for a clutch timeout period.

18. The power tool of claim 17, wherein the controller is further configured to:
drive, in response to the clutch timeout period having passed, the motor according to the first speed setting.

19. The power tool of claim 17, wherein the first speed threshold is equal to the second speed threshold.

20. The power tool of claim 17, further comprising an input device configured to set a desired torque value, and wherein the controller is further configured to:
calculate a torque limit based on the desired torque value, and
control the motor based in part on the torque limit.

* * * * *